United States Patent
Hosseini

(10) Patent No.: US 10,391,588 B2
(45) Date of Patent: Aug. 27, 2019

(54) METHOD AND SYSTEM FOR SCRIBING BRITTLE MATERIAL FOLLOWED BY CHEMICAL ETCHING

(71) Applicant: ROFIN-SINAR TECHNOLOGIES INC., Plymouth, MI (US)

(72) Inventor: S. Abbas Hosseini, Los Altos, CA (US)

(73) Assignee: ROFIN-SINAR TECHNOLOGIES LLC, Plymouth, MI (US)

( * ) Notice: Subject to any disclaimer, the term of this patent is extended or adjusted under 35 U.S.C. 154(b) by 458 days.

(21) Appl. No.: 14/985,365

(22) Filed: Dec. 30, 2015

(65) Prior Publication Data

US 2016/0199944 A1    Jul. 14, 2016

Related U.S. Application Data

(60) Provisional application No. 62/103,031, filed on Jan. 13, 2015.

(51) Int. Cl.
| | | |
|---|---|---|
| *B32B 3/00* | (2006.01) | |
| *B23K 26/402* | (2014.01) | |
| *B23K 26/362* | (2014.01) | |
| *B23K 26/0622* | (2014.01) | |
| *B23K 26/364* | (2014.01) | |

(Continued)

(52) U.S. Cl.
CPC ........ *B23K 26/402* (2013.01); *B23K 26/0622* (2015.10); *B23K 26/0624* (2015.10); *B23K 26/361* (2015.10); *B23K 26/362* (2013.01); *B23K 26/364* (2015.10); *B23K 2103/50* (2018.08)

(58) Field of Classification Search
CPC ... B23K 26/362; B23K 26/364; B23K 26/402
See application file for complete search history.

(56) References Cited

U.S. PATENT DOCUMENTS

| | | | |
|---|---|---|---|
| 5,107,510 A | 4/1992 | Seguin et al. | |
| 5,567,336 A | 10/1996 | Tatah | |
| 5,609,284 A | 3/1997 | Kondratenko | |

(Continued)

FOREIGN PATENT DOCUMENTS

| | | |
|---|---|---|
| CA | 2332154 | 9/2009 |
| CA | 2907757 | 9/2014 |

(Continued)

OTHER PUBLICATIONS

The International Searching Authority, PCT International Search Report, dated Apr. 29, 2016, pp. 1-5, International Application No. PCT/US2015/068205, Applicant: Rofin-Sinar Technologies Inc.

(Continued)

*Primary Examiner* — Elizabeth E Mulvaney
(74) *Attorney, Agent, or Firm* — Woodling, Krost and Rust

(57) ABSTRACT

Very fine closed form structures can be scribed via filamentation in the transparent substrate very quickly, the modified zone can be etched via dry or wet chemical etching to release the closed form. A metal layer engages the transparent substrate and is covered with photoresist. A portion of the photoresist and a portion of the metal are removed simultaneously with the creation of a filament through the transparent substrate. The photoresist protects the portion of the metal layer that is not removed. The desired closed form can be released by weakening the cut region using dry or wet chemical etching to remove the desired part.

24 Claims, 21 Drawing Sheets

(51) Int. Cl.
*B23K 26/361* (2014.01)
*B23K 103/00* (2006.01)

(56) References Cited

U.S. PATENT DOCUMENTS

| | | | |
|---|---|---|---|
| 6,084,897 | A | 7/2000 | Wakabayashi et al. |
| 6,333,485 | B1 | 12/2001 | Haight et al. |
| 6,407,360 | B1 | 6/2002 | Choo et al. |
| 6,417,485 | B1 | 7/2002 | Troitski |
| 6,552,301 | B2 | 4/2003 | Herman et al. |
| 7,033,519 | B2 | 4/2006 | Taylor et al. |
| 7,211,184 | B2 | 5/2007 | Webster et al. |
| 7,218,448 | B1 | 5/2007 | Cathey, Jr. et al. |
| 7,303,977 | B2 | 12/2007 | Voronov et al. |
| 7,605,344 | B2 | 10/2009 | Fukumitsu |
| 7,626,138 | B2 | 12/2009 | Bovatsek et al. |
| 8,097,830 | B2 | 1/2012 | Woeste et al. |
| 8,624,157 | B2 | 1/2014 | Albelo et al. |
| 8,835,802 | B2 | 9/2014 | Baer |
| 8,842,358 | B2 | 9/2014 | Bareman et al. |
| 8,852,698 | B2 | 10/2014 | Fukumitsu |
| 9,102,007 | B2 | 8/2015 | Hosseini |
| 9,102,011 | B2 | 8/2015 | Hosseini |
| 2002/0125232 | A1 | 9/2002 | Choo et al. |
| 2002/0195433 | A1 | 12/2002 | Troitski |
| 2003/0006221 | A1 | 1/2003 | Hong et al. |
| 2003/0072890 | A1 | 4/2003 | Miyazawa |
| 2004/0017428 | A1 | 1/2004 | Cronin et al. |
| 2004/0248503 | A1 | 12/2004 | Benderly |
| 2005/0006361 | A1 | 1/2005 | Kobayashi et al. |
| 2005/0186760 | A1 | 8/2005 | Hashimura et al. |
| 2005/0269301 | A1 | 12/2005 | Burrowes et al. |
| 2005/0272223 | A1 | 12/2005 | Fujii et al. |
| 2006/0099810 | A1 | 5/2006 | Voronov et al. |
| 2006/0108339 | A1 | 5/2006 | Nishiwaki et al. |
| 2006/0207976 | A1 | 9/2006 | Bovatsek et al. |
| 2007/0051706 | A1 | 3/2007 | Bovatsek et al. |
| 2007/0298529 | A1 | 12/2007 | Maeda et al. |
| 2009/0151996 | A1 | 6/2009 | Mishima et al. |
| 2009/0294422 | A1 | 12/2009 | Lubatschowski et al. |
| 2010/0025387 | A1 | 2/2010 | Arai et al. |
| 2010/0084384 | A1 | 4/2010 | Bovatsek et al. |
| 2010/0279067 | A1 | 11/2010 | Sabia et al. |
| 2011/0259631 | A1 | 10/2011 | Rumsby |
| 2012/0234807 | A1 | 9/2012 | Sercel et al. |
| 2012/0235969 | A1 | 9/2012 | Burns et al. |
| 2013/0126573 | A1 | 5/2013 | Hosseini et al. |
| 2013/0183837 | A1 | 7/2013 | Arai et al. |
| 2013/0293482 | A1 | 11/2013 | Burns et al. |
| 2014/0079570 | A1 | 3/2014 | Schweitzer et al. |
| 2014/0199519 | A1 | 7/2014 | Schillinger et al. |
| 2014/0213040 | A1 | 7/2014 | Morikazu et al. |
| 2014/0248757 | A1 | 9/2014 | Morikazu et al. |
| 2014/0340730 | A1 | 11/2014 | Bergh et al. |
| 2015/0166393 | A1 | 6/2015 | Marjanovic et al. |
| 2015/0166394 | A1 | 6/2015 | Marjanovic et al. |
| 2015/0360991 | A1 | 12/2015 | Grundmueller et al. |
| 2015/0367442 | A1 | 12/2015 | Bovatsek et al. |
| 2016/0009586 | A1 | 1/2016 | Bookbinder et al. |
| 2016/0031745 | A1 | 2/2016 | Ortner et al. |
| 2016/0059359 | A1 | 3/2016 | Krueger et al. |
| 2016/0060156 | A1 | 3/2016 | Krueger et al. |

FOREIGN PATENT DOCUMENTS

| | | |
|---|---|---|
| CN | 102785031 | 4/2015 |
| EP | 2781296 | 9/2014 |
| EP | 2898982 A2 | 12/2014 |
| EP | 2868421 A1 | 5/2015 |
| EP | 2754524 | 11/2015 |
| JP | 2006305803 | 11/2006 |
| JP | 2009066627 A | 4/2009 |
| JP | 2010160734 | 7/2010 |
| JP | 4692717 | 3/2011 |
| JP | 5089735 | 9/2012 |
| JP | 5271092 | 5/2013 |
| WO | 0125137 A1 | 4/2001 |
| WO | 2009114375 A2 | 9/2009 |
| WO | 2010111089 A2 | 9/2010 |
| WO | 2012006736 | 1/2012 |
| WO | 2012094737 A1 | 7/2012 |
| WO | 2014075995 | 5/2014 |
| WO | 2014079570 | 5/2014 |
| WO | 2014111385 | 7/2014 |
| WO | 2014111794 | 7/2014 |
| WO | 2014121261 | 8/2014 |
| WO | 2014134470 | 9/2014 |
| WO | 2014144322 | 9/2014 |
| WO | 2014147048 | 9/2014 |
| WO | 2014161535 | 10/2014 |
| WO | 2015075059 | 5/2015 |
| WO | 2015094994 | 6/2015 |
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

The International Bureau of WIPO, PCT International Preliminary Report on Patentability, dated Jul. 18, 2017, pp. 1-8, International Application No. PCT/US2015/068205, Applicant: Rofin-Sinar Technologies Inc.

The International Bureau of WIPO, PCT Notification Concerning Transmittal of International Report on Patentability, dated Jul. 27, 2017, pp. 1, International Application No. PCT/US2015/068205, Applicant: Rofin-Sinar Technologies Inc.

The International Searching Authority, PCT Written Opinion of the International Searching Authority, dated Apr. 29, 2016, pp. 1-9, International Application No. PCT/US2015/068205, Applicant: Rofin-Sinar Technologies Inc.

Strigin et al., Laser Processing of Glass by Picosecond Pulses, Quantum Electronics, 1994, pp. 732-735, vol. 24, No. 8, Kvantovaya Elektronika and Turpion Ltd.

Bhuyan et al., High Aspect Ratio Taper-Free Microchannel Fabrication Using Femtosecond Bessel Beams, Optics Express, Jan. 18, 2010, pp. 566-574, vol. 18, No. 2.

Migliore et al., Advances in Laser Singulation of Silicon, Paper #770, pp. 1-6, Coherent, Inc., Santa Clara, CA, USA; HBL Corporation, Daejeon 305-811 Korea.

Watanabe et al., Filamentation in Ultrafast Laser Material Processing, Book for Springer Series "Progress in Ultrafast Intense Laser Science", pp. 1-6.

Yoshino et al., Micromachining With a High Repetition Rate Femtosecond Fiber Laser, JLMN—Journal of Laser Micro/Nanoengineering, 2008, pp. 157-162, vol. 3, No. 3.

Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.

Nguyen et al., Optical Breakdown Versus Filamentation in Fused Silica by Use of Femtosecond Infrared Laser Pulses, Optics Letter, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 1-4.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.

(56) References Cited

OTHER PUBLICATIONS

Hosseini, S. Abbas, System for Performing Laser Filamentation Within Transparent Materials, U.S. Appl. No. 14/336,912, filed Jul. 21, 2014, Applicant: Rofin-Sinar Technologies Inc.
Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.
Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.
Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies Inc.
Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.
Applied Biosystems Chemistry Guide, DNA Sequencing by Capillary Electrophoresis, Second Edition, 2009, pp. 1-310.
PE Applied Biosystems, Automated DNA Sequencing, Chemistry Guide, 1998, pp. 1-245.
Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.
Muller et al, Short-Pulse Lasers Enable Transparent Materials Processing, Industrial Photonics, Oct. 2014, pp. 8-10.
Hosseini, S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies Inc.
European Patent Office, Extended European Search Report, dated Mar. 18, 2015, pp. 1-6, Application No. 14179302.4, Applicant: Rofin-Sinar Technologies, Inc.
Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.
Hosseini et al., Measurement of a Filament Length Generated by an Intense Femtosecond Laser Pulse Using Electromagnetic Radiation Detection, Applied Physics B, 2003, pp. 583-586, vol. 76, Quebec, Canada.
Hosseini et al., Multi-Parameter Characterization of the Longitudinal Plasma Profile of a Filament: A Comparative Study, Applied Physics B, 2004, pp. 519-523, vol. 79.
Hosseini et al., Competition of Multiple Filaments During the Propagation of Intense Femtosecond Laser Pulses, The Americal Physical Society, Physical Review A 70, 033802, 2004, pp. 1-12.
Arnold et al., Laser Direct-Write Techniques for Priting of Complex Materials, MRS Bulletin, Jan. 2007, vol. 32 pp. 23-31.
Nagel et al., Laser-Induced Forward Transfer for the Fabrication of Devices, Nannomaterials: Processing and Characterization With Lasers, First Edition, 2012, Published by Wiley-VCH Verlag GmbH & Co. KGAA, pp. 255-316.
Palla-Papavlu et al., Laser Induced Forward Transfer for Materials Patterning, Romanian Reports in Physics, Aug. 2011, vol. 63, Supplement, pp. 1285-1301.
Pique et al., Digital Microfabrication by Laser Decal Transfer, JLMN—Journal of Laser Micro/Nanoengineering, 2008, vol. 3, No. 3, pp. 163-169.
European Patent Office, European Search Report, dated May 18, 2015, pp. 1-6, Application No. 14193909.0, Applicant: Rofin-Sinar Technologies, Inc.
Gill, Jonathan, Creating an Exotic New Form of Light With Simple Optical Elements, Nov. 2014, pp. 1-21, Waldorf School of Garden City, Garden City, New York, Laser Teaching Center Department of Physics and Astronomy, Stony Brook University, Intel Science Talent Search.
Dowski et al., Extended Depth of Field Through Wave-Front Coding, Applied Optics, Apr. 10, 1995, vol. 34, No. 11, pp. 1859-1866.
Arnison et al., High Resolution Extended Depth of Field Microscopy Using Wavefront Coding, pp. 1-19.
Siviloglou, Georgios A., Accelerating Optical Airy Beams, Dissertation, 2010, pp. 1-166.
Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies, Inc.
Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.
Hosseini, S. Abbas, Method and Apparatus for Laser Processing of Silicon by Filamentation of Burst Ultrafast Laser Pulses, U.S. Appl. No. 14/556,078, filed Nov. 28, 2014, Applicant: Rofin-Sinar Technologies, Inc.
Hosseini, S. Abbas, Method and Apparatus for Material Processing Using Multiple Filamentation of Burst Ultrafast Laser Pulses, U.S. Appl. No. 14/629,327, filed Feb. 23, 2015, Applicant: Rofin-Sinar Technologies, Inc.
Hosseini, S. Abbas, Method and System for Scribing Heat Processed Transparent Materials, U.S. Appl. No. 14/700,228, filed Apr. 30, 2015, Applicant: Rofin-Sinar Technologies, Inc.
Hosseini, S. Abbas, Method and Apparatus for Performing Laser Curved Filamentation Within Transparent Materials, U.S. Appl. No. 14/742,187, filed Jun. 17, 2015, Applicant: Rofin-Sinar Technologies, Inc.
European Patent Office, Extended European Search Report, dated Jul. 29, 2015, pp. 1-8, Application No. 14193908.2, Applicant: Rofin-Sinar Technologies, Inc.
European Patent Office, Extended European Search Report, dated Jul. 14, 2015, pp. 1-14, Application No. 14195892.6, Applicant: Rofin-Sinar Technologies, Inc.
European Patent Office, Extended European Search Report, dated Feb. 26, 2015, pp. 1-7. Application No. 14193911.6, Applicant: Rofin-Sinar Technologies, Inc.
European Patent Office, Extended European Search Report, dated Mar. 11, 2015, pp. 1-6, Application No. 14191146.1, Applicant: Rofin-Sinar Technologies, Inc.
European Patent Office, Partial European Search Report, dated May 18, 2015, pp. 1-6, Application No. 14193909, Applicant: Rofin-Sinar Technologies, Inc.
European Patent Office, Extended European Search Report, dated Sep. 14, 2015, pp. 1-7, Application No. 14179403.2, Applicant: Rofin-Sinar Technologies, Inc.
European Patent Office, Extended European Search Report, dated Sep. 24, 2015, pp. 1-13, Application No. 14193909, Applicant: Rofin-Sinar Technologies, Inc.

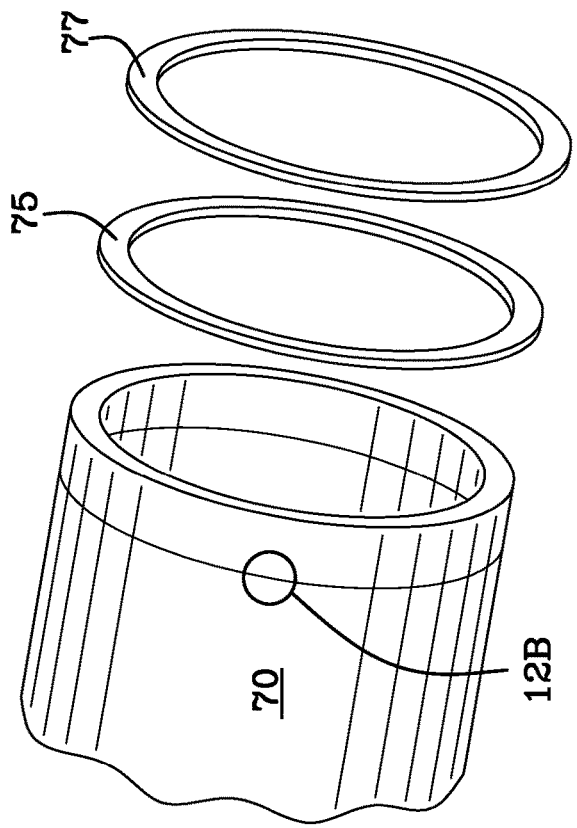
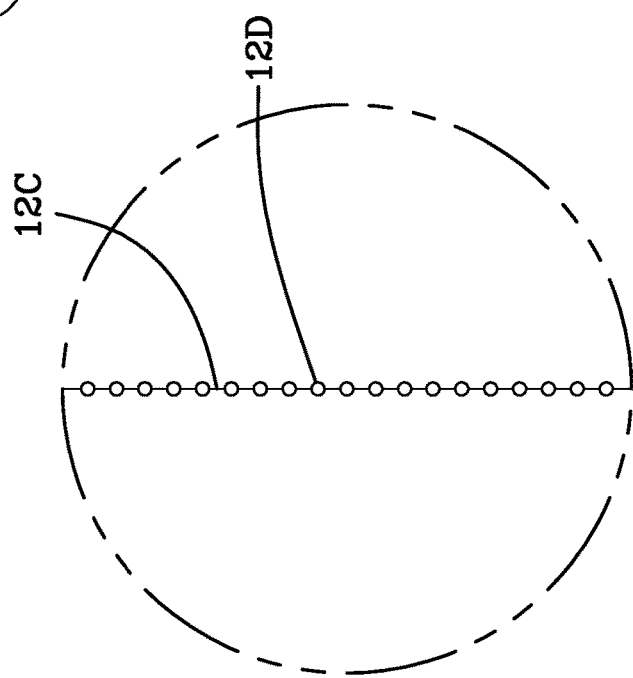
FIG. 5A
FIG. 5B

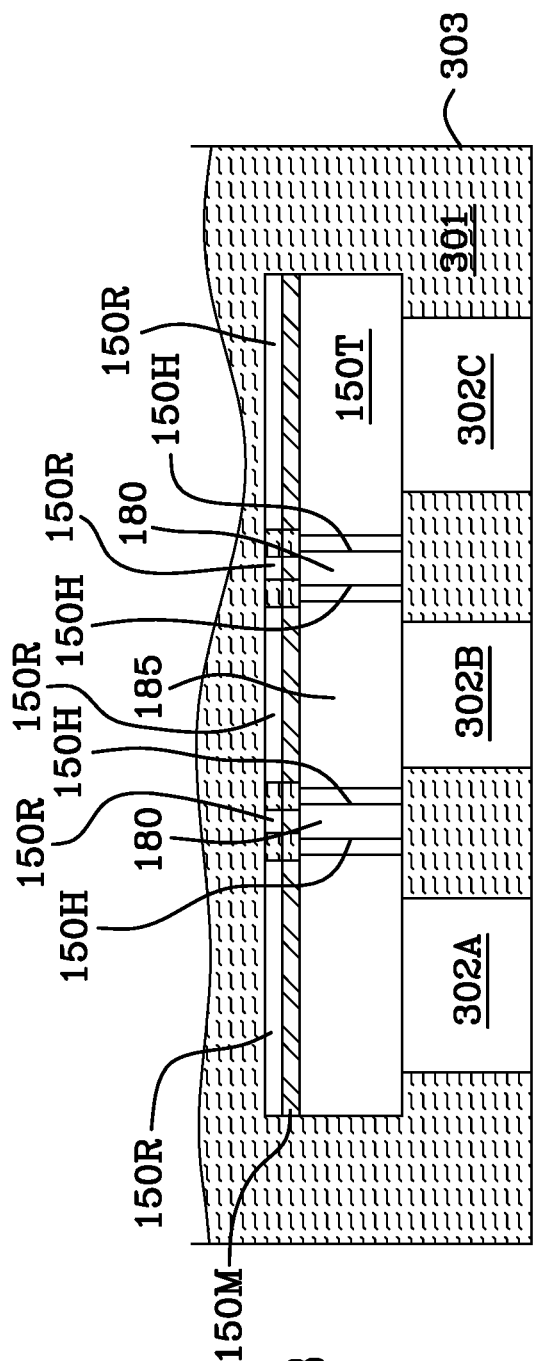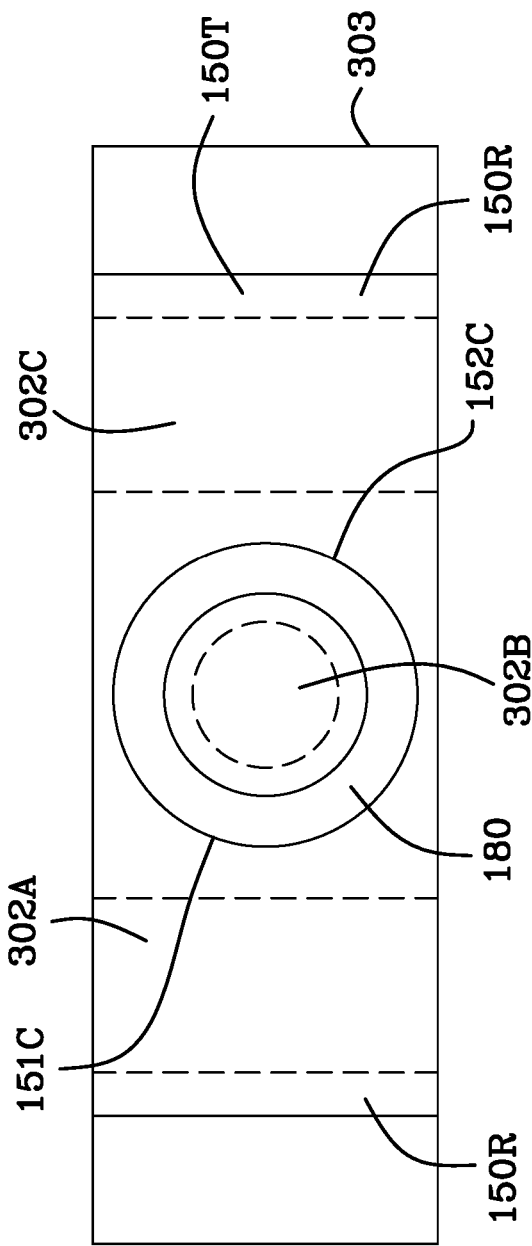

METHOD AND SYSTEM FOR SCRIBING BRITTLE MATERIAL FOLLOWED BY CHEMICAL ETCHING

This patent application claims the benefit and priority of U.S. provisional patent application Ser. No. 62/103,031 filed Jan. 13, 2015. U.S. provisional patent application Ser. No. 62/103,031 filed Jan. 13, 2015 is incorporated herein by reference hereto in its entirety.

U.S. patent application Ser. No. 13/640,140, filed Jan. 31, 2013, U.S. patent application Ser. No. 14/336,912, filed Jul. 21, 2014, and U.S. patent application Ser. No. 14/336,819, filed Jul. 21, 2014 are hereby incorporated herein by reference hereto as if fully written herein.

BACKGROUND OF THE INVENTION

The present disclosure is related to systems and methods for the laser processing of materials. More particularly, the present disclosure is related to systems and methods for the singulation and/or cleaving of wafers, substrates, and plates containing passive or active electronic or electrical devices created upon said materials.

In current manufacturing, the singulation, dicing, scribing, cleaving, cutting, and facet treatment of wafers or glass panels is a critical processing step that typically relies on diamond or conventional, ablative or breakdown (stealth) laser scribing and cutting, with speeds of up to 30 cm/sec for LEDs, LED devices (such as lighting assemblies) and illuminated devices (such as LED displays) as some examples.

In the diamond cutting process, after diamond cutting is performed, a mechanical roller applies stress to propagate cracks that cleave the sample. This process creates poor quality edges, microcracks, wide kerf width, and substantial debris that are major disadvantages in the lifetime, efficiency, quality, and reliability of the product, while also incurring additional cleaning and polishing steps. The cost of de-ionized water to run the diamond scribers are more than the cost of ownership of the scriber and the technique is not environmentally friendly since water becomes contaminated and needs refining, which further adds to the production cost.

Laser ablative machining has been developed for singulation, dicing, scribing, cleaving, cutting, and facet treatment, to overcome some of the limitations associated with diamond cutting. Unfortunately, known laser processing methods have disadvantages, particularly in transparent materials, such as slow processing speed, generation of cracks, contamination by ablation debris, and moderated sized kerf width. Furthermore, thermal transport during the laser interaction can lead to large regions of collateral thermal damage (i.e. heat affected zone).

Laser ablation processes can be improved by selecting lasers with wavelengths that are strongly absorbed by the medium (for example, deep UV excimer lasers or far-infrared $CO_2$ laser). However, the aforementioned disadvantages cannot be eliminated due to the aggressive interactions inherent in this physical ablation process. This is amply demonstrated by the failings of UV processing in certain LED applications where damage has driven the industry to focus on traditional scribe and break followed by etching to remove the damaged zones left over from the ablative scribe or the diamond scribe tool, depending upon the particular work-around technology employed.

Alternatively, laser ablation can also be improved at the surface of transparent media by reducing the duration of the laser pulse. This is especially advantageous for lasers that are transparent inside the processing medium. When focused onto or inside transparent materials, the high laser intensity induces nonlinear absorption effects to provide a dynamic opacity that can be controlled to accurately deposit appropriate laser energy into a small volume of the material as defined by the focal volume. The short duration of the pulse offers several further advantages over longer duration laser pulses such as eliminating plasma creation and therefor plasma reflections thereby reducing collateral damage through the small component of thermal diffusion and other heat transport effects during the much shorter time scale of such laser pulses.

Femtosecond and picosecond laser ablation, therefore, offer significant benefits in machining of both opaque and transparent materials. However, in general, the machining of transparent materials with pulses even as short as tens to hundreds of femtoseconds is also associated with the formation of rough surfaces, slow throughput and micro-cracks in the vicinity of laser-formed kerf, hole or trench that is especially problematic for brittle materials like alumina ($Al_2O_3$), glasses, doped dielectrics and optical crystals. Further, ablation debris will contaminate the nearby sample and surrounding devices and surfaces. Recently, multi-pass femtosecond cutting has been discussed in Japan, utilizing a fiber laser approach. This approach suffers from the need to make multiple passes and therefore results in low processing throughput.

Although laser processing has been successful in overcoming many of the limitations associated with diamond cutting, as mentioned above, new material compositions have rendered the wafers and panels incapable of being laser scribed. Furthermore, the size of the devices and dice on the wafers are getting smaller and closer to each other that limit the utility of both diamond and conventional laser-based scribing. For example, 30 µm is a feasible scribing width, while 15 µm is challenging for these conventional methods. Moreover, as diamond scribing uses mechanical force to scribe the substrate, thin samples are very difficult to scribe. Due to the use of increasingly exotic and complex material stacks in the fabrication of wafer-based devices, the laser scribing techniques previously applied will simply no longer work due to the opacity of the stack.

SUMMARY OF THE INVENTION

Systems and methods are described for forming continuous laser filaments in transparent materials. The transparent material may be selected from the group consisting of glass, borosilicate glass, amber glass, chemically or heat strengthened glass, sapphire, $LiNbO_3$, Silicon, Ti:Sapphire, $LiTaO_3$, transparent ceramics (including the optical ceramic ALON), crystalline rods, GaN, SiC and ZnSe.

A burst of ultrafast laser pulses is focused such that a beam waist is formed external to the material being processed, such that a primary focus does not form within the material, while a sufficient energy density is formed within an extended region within the material to support the formation of a continuous filament, without causing optical breakdown within the material. Filaments formed according to this method may exhibit lengths exceeding up to 10 mm with a 1:1 correspondence in the length of the modified zone (in that the filament is the agent of modification, so the modified zone tracks 1:1 with the extent of the filament) and a taper-free profile when viewed with the long axis in cross-section. In some embodiments, an uncorrected or aberrated optical focusing element is employed to produce an external beam waist while producing distributed focusing (elongated focus) of the incident beam within the material. Various systems are described that facilitate the formation of filament arrays within transparent substrates for cleaving/singulation and/or marking. Optical monitoring of the filaments may be employed to provide feedback to facilitate active control of the process.

Accordingly, in a first aspect, there is provided a method of laser processing a transparent material, the method comprising:

a laser source configured to provide a laser beam comprising bursts of laser pulses;

one or more focusing elements configured to externally focus the laser beam relative to the transparent material to form a beam waist at a location external to the transparent material while avoiding the formation of an external plasma channel;

the laser beam and one or more focusing elements are configured to produce sufficient energy density within the transparent material to form a continuous laser filament therein without causing optical breakdown;

means for varying a relative position between the laser beam and the transparent material;

a control and processing unit operatively coupled to the means for varying the relative position between the laser beam and the transparent material;

the control and processing unit is configured to control the relative position between the laser beam and the transparent material for the formation of an array of continuous laser filaments within the transparent material;

the array of continuous laser filaments extending continuously from a first surface of the transparent material to a second surface of the transparent material; and, selectively wet or dry etching the array of continuous laser filaments for releasing the closed form In another aspect, there is provided a method of processing a transparent material, comprising the steps of:

the transparent material has a metal layer formed in engagement with the transparent material and the metal layer has a photoresist layer formed in engagement with the metal layer, providing a laser beam, the laser beam includes a burst of laser pulses, the burst of laser pulses may be a single pulse or multiple pulses;

externally focusing the laser beam relative to the transparent material to form a beam waist at a location that is external to the transparent material while avoiding the formation of an external plasma channel;

the laser pulses are focused such that sufficient energy density is maintained within the transparent material to form a continuous laser filament therein without causing optical breakdown;

simultaneously forming the continuous laser filament within the transparent material and simultaneously forming a low-power laser beam to ablate the photoresist layer and the metal layer, the power of the filament-forming laser beam is reduced below the threshold for the simultaneous of the filament within and through the transparent material while maintaining sufficient power to ablate and irradiate the photoresist layer and the metal layer with the low-power laser beam at one or more locations such that the metal layer is locally ablated by the laser beam thereby removing the metal layer in proximity to a hole through the transparent material formed by the continuous laser filament; and, selectively etching the hole through the substrate of the transparent material while the photoresist avoids damage to damage to the metal layer.

In another aspect, there is provided a method of processing a transparent material, comprising the steps of:

the transparent material has a metal layer formed in engagement with the transparent material and the metal layer has a photoresist layer formed in engagement with the metal layer;

providing a laser beam, the laser beam includes a burst of laser pulses, the burst of laser pulses may be a single pulse or multiple pulses;

externally focusing the laser beam relative to the transparent material to form a beam waist at a location that is external to the transparent material while avoiding the formation of an external plasma channel;

the laser pulses are focused such that sufficient energy density is maintained within the transparent material to form a continuous laser filament therein without causing optical breakdown;

simultaneously forming the continuous laser filament within the transparent material and simultaneously forming a low-power laser beam to ablate the photoresist layer and the metal layer, the power of the filament-forming laser beam is reduced below the threshold for the simultaneous of the filament within and through the transparent material while maintaining sufficient power to ablate and irradiate the photoresist layer and the metal layer with the low-power laser beam at one or more locations such that the metal layer is locally ablated by the laser beam thereby removing the metal layer in proximity to a hole through the transparent material formed by the continuous laser filament;

creating a plurality of holes through the transparent substrate and removing a portion of the metal layer and a portion of the photoresist layer in proximity to each one of the holes of the plurality of holes through the substrate; and, selectively etching the hole through the substrate of the transparent material while the photoresist avoids damage to damage to the metal layer.

In another aspect, there is provided a method of processing a transparent material, comprising the steps of:

the transparent material includes a metal layer in engagement with the transparent material, and, a photoresist layer resides in engagement with the metal layer;

providing a laser beam, the laser beam having a plurality of bursts and each of the bursts include a plurality of pulses;

generating an initial waist of the laser beam outside the transparent material using an uncorrected or aberrated optical focusing element;

generating a weakly focused laser beam distributed within the transparent material;

producing a spatially extended and spatially homogenous filament in the transparent material;

forming an array of filaments within the transparent substrate;

removing a portion of the metal layer and a portion of the photoresist proximate each of the continuous laser filaments; and, selectively dry or wet etching the array of continuous laser filaments.

In another aspect there is provided a transparent material having a continuous laser filament formed there In another aspect there is provided a transparent material having a continuous laser filament formed therein, the continuous laser filament having a length exceeding approximately 1 mm.

In another aspect, there is provided a transparent substrate exhibiting a post-cleave or post-singulation break strength that exceeds approximately 50 MPa.

Very fine closed form structures can be scribed via filamentation in the transparent substrate very quickly, the modified zone can be etched via dry or wet chemical etching to release the closed form.

The transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics (like ALON) crystalline rods, GaN, SiC and ZnSe.

The dry etchants include, but are not limited to, the following: Carbon Tetrafluoride $CF_4$, Sulfur Hexafluoride $SF_6$, Nitrogen Trifluoride $NF_3$, Chlorine $Cl_2$, and Dichlordifluoro methane $CCl_2F_2$. The wet etchants include, but are not limited to, the following: Nitric acid (HNO3) and Hydrofluoric acid (HF), Potassium hydroxide (KOH), Ethylenediamine pyrocatechol (EDP), and Tetramethylammonium hydroxide (TMAH).

A further understanding of the functional and advantageous aspects of the disclosure can be realized by reference to the following detailed description and drawings.

BRIEF DESCRIPTION OF THE DRAWINGS

FIG. 5A is an illustration of two sections cut from a transparent tube.

FIG. 5B is an enlargement of a portion of the tube illustrating orifices in the transparent tube and microcracks between the orifices.

FIG. 13 is a side schematic view illustrating a transparent substrate with holes therethrough, the metal layer engaging the transparent substrate, photoresist engaging the metal layer, being wet etched—the transparent substrate, metal layer and photoresist are submersed in a chemical etchant;

FIG. 13A is a top view of the transparent substrate illustrated in FIG. 13 illustrating a plurality of holes through the substrate with a crack line formed between the holes thereof; and, FIG. 14 is a side schematic view illustrating a transparent substrate with holes therethrough being dry etched, the transparent substrate has a metal layer in engagement with a surface of the transparent substrate and a layer of photoresist is in engagement with the metal layer.

DETAILED DESCRIPTION OF THE INVENTION

Embodiments of the disclosure will now be described by way of example only.

Figure 1:
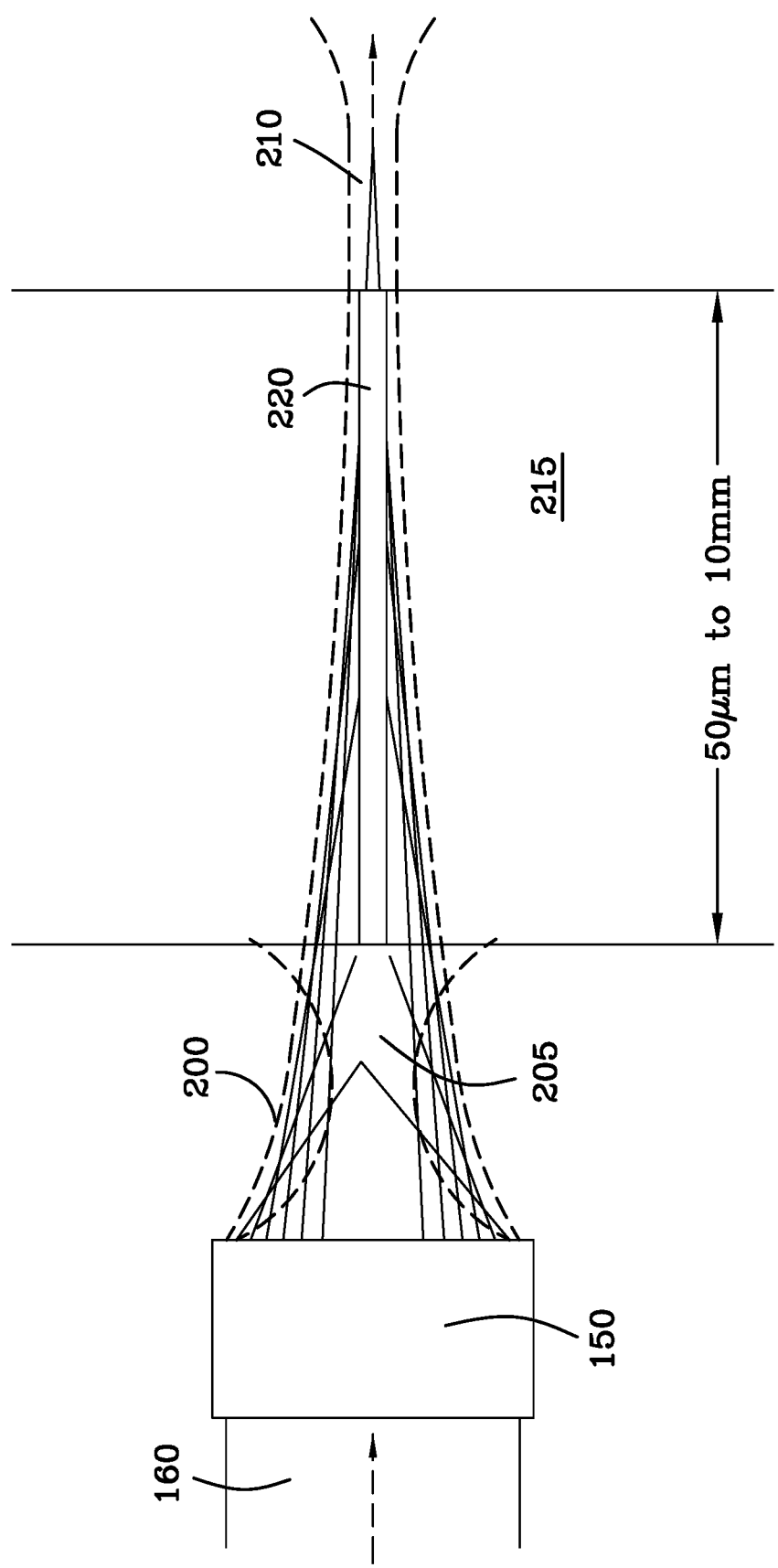
FIG. 1 illustrates optical configurations for the formation of filaments in which long homogeneous filaments are formed by focusing the beam energy such that it is "dumped" into a focus above and/or below the target transparent material (forming an "optical reservoir") in order to modulate the amount of energy passed into the desired filament zone.

FIG. 1 illustrates optical configurations for the formation of filaments in which long homogeneous filaments 220 are formed by focusing the beam energy such that it is "dumped" into a focus above and/or below the transparent target material (forming an optical reservoir 220) in order to modulate the amount of energy passed into the desired filament zone. Incoming laser beam 160 passes through a distributed focus assembly 150 which creates foci above or below 210 the target substrate 215.

The propagation of ultrafast laser pulses in transparent optical media is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPI/TI) of electrons from the valence band to the conduction band, plasma defocusing, and self-steepening. See SL Chin et al. Canadian Journal of Physics, 83, 863-905 (2005). These effects play out to varying degrees that depend on the laser parameters, material nonlinear properties, and the focusing condition into the material. Due to the dependence of nonlinear refractive index to intensity, during the propagation of intense laser pulses, the central part of the pulse moves slower than the surrounding parts of the pulse due to variable refractive index that causes the pulse to self-focus. In the self focusing region due to MPI/TI plasma generated, plasma acts as negative lens and defocuses the pulse but due to high intensity self-focusing occurs again. The balancing act between focusing and defocusing creates a long plasma channel that is known as filament. Using a low per pulse energy filament leaves traces of refractive index modification in the material. The filament is surrounded by background energy that pumps energy to form the filament. This background energy is known as a filament reservoir in the art. Blocking or disturbing a portion of reservoir will have the effect of losing the filament. For this reason the space separation between the filaments is crucial for filament forming. Otherwise damage and cracks form in the substrate instead of scribing. During filament formation a photoacoustic effect takes place which is inherent of plasma generation. This opens up less than 1 μm diameter confined holes into the substrate and depending on the laser input power can reach up to 10 mm long without changing the diameter. For this reason it is possible to stack many sheets of flat substrates and scribe all of them in single motion. Filaments can form using a single pulse ultrafast laser inside the material as far as higher than critical peak power for that specified material is used. While using multiple pulses as train of pulses or burst helps for much better filament formation due to heat accumulation and consecutive photoacoustic shock wave generation. While optical break down which is the consequence of a tight focus inside the material (plasma void forms and laser focuses) the filament is the result of very mild focus using a NA of less than 0.4 where the focusing element only helps formation of the filament. While geometrical focus might have a 100 to 200 μm point spread function on the surface of target, the pulses self focus themselves to the 1 μm diameter range which in linear optics is possible by using a NA of 1 or higher (100× objective oil immersed). While the terms "filament" or "plasma channel" are usually used as the standard terms for defining this process, some in the art describe this process as an "elongated focus" to describe the same effect. Elongated focus is the result of using ultrafast pulses. It is impossible to elongate, for example, long laser pulses and observe the same effect.

Others in the art describe this process as "burst ultrafast filament formation" and claim that the first pulse makes a waveguide and that consecutive pulses follow the waveguide.

Meanwhile the heat accumulation effect would disappear if a burst frequency of 1 MHz or lower is used. Heat accumulation works very well to produce well pronounced filaments when 30 to 60 MHz burst frequency. At this condition a narrow crack less than 100 nm wide forms from filament to filament. This creates a curtain (crack wall) all the way from top to bottom of the sample along the scribe line. Applying leak detector dye proved that dye can pass through the scribe line and end up on another surface. The capillary effect enables dye to travel all the way inside the crack curtain and filament channels.

While we disclose use of a 30 MHz seeder in the Rofin StarPico model, 30 MHz is our standard burst frequency and single or multiple pulses can be picked at 100 kHz frequency to form the burst envelope. The single or multiple pulses can be further amplified to reach 50 W average power at less than 15 ps. The burst envelope has is 1-6 pulses therein and exceeds the critical power necessary to make filaments in the glass substrate.

Figure 2:
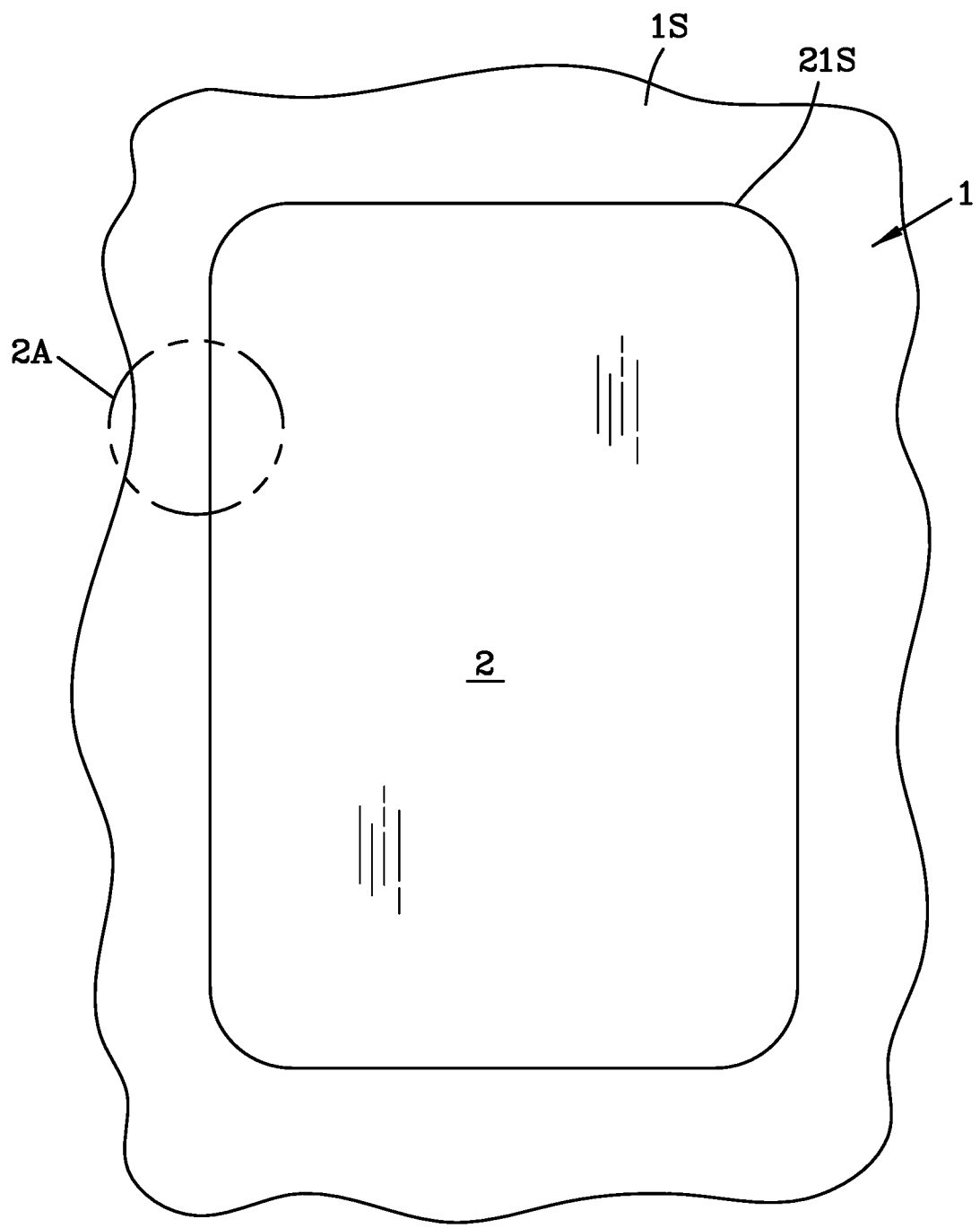
FIG. 2 is a diagrammatic illustration of a substrate with scribed closed form where the closed form is the desired part.

FIG. 2 is a diagrammatic illustration of a substrate with scribed closed form where the closed form is the desired part. The closed form (desired part) is the part in the middle of FIG. 2 denoted by reference numeral 2.

There are clearly two strategies when the main body or closed form is the desired part. As shown in FIG. 2, product 2 is the closed form that is the desired part formed via filamentation scribing on the main substrate 1. Referring to FIG. 2, solid line 21S represents the scribed line which is cut into the surface 1S of the substrate 1. An example closed form can be, but is not limited to, a smartphone cover glass or auto windshield, mirrors, architectural windows, etc.

Figure 2A:
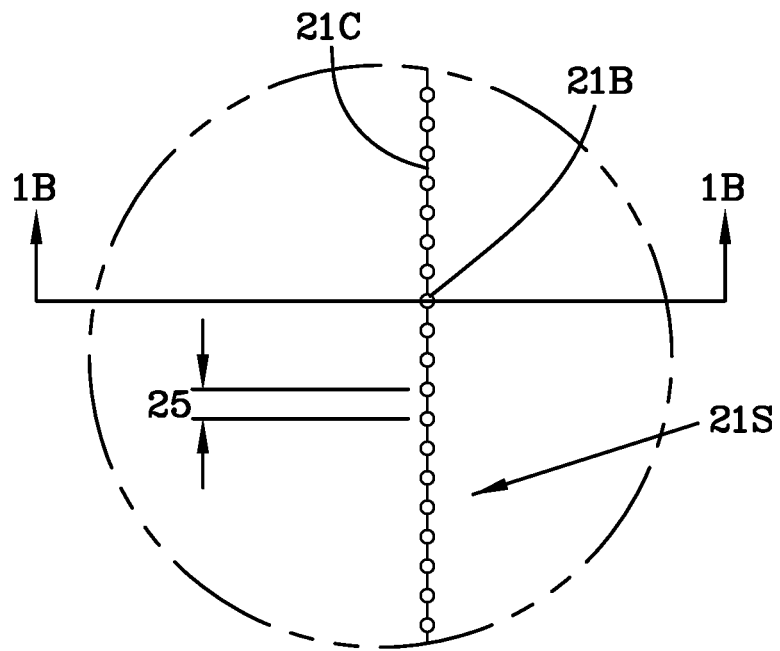
FIG. 2A is an enlarged portion of FIG. 1 illustrating the spacing between orifices/holes.

FIG. 2A is an enlarged portion of FIG. 2 illustrating the spacing between holes (orifices) 21B. Orifices 21B are approximately 1 μm diameter. Microcracks 21C are illustrated between the orifices 21B in FIG. 2A. Microcracks 21C are created by a shock wave due to photoacoustic compression. The spacing between the holes (orifices) is 2-10 μm center to center as illustrated by reference numeral 25 depending on the type of form (sample type), substrate thickness and orifice depth.

Figure 2B:
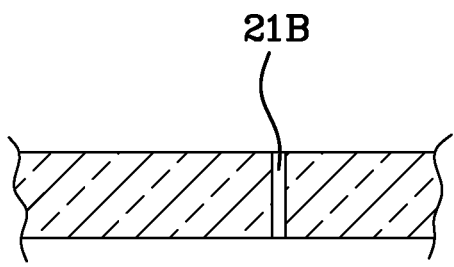
FIG. 2B is a diagrammatic cross-sectional view taken along the lines of 1B-1B of FIG. 2A.

FIG. 2B is a diagrammatic cross-sectional view taken along the lines of 1B-1B of FIG. 2A. Orifice 21B extends completely through the substrate. All of the orifices drilled in the transparent substrate are substantially cylindrically shaped with no taper. Desired closed form can be released via different technique such as weakening the cut region by resting the sample in water for OH exchange, heating, cooling, or applying air pressure. One main aspect disclosed herein is to use dry or wet chemical etching to remove the desired part from the body.

Figure 3:
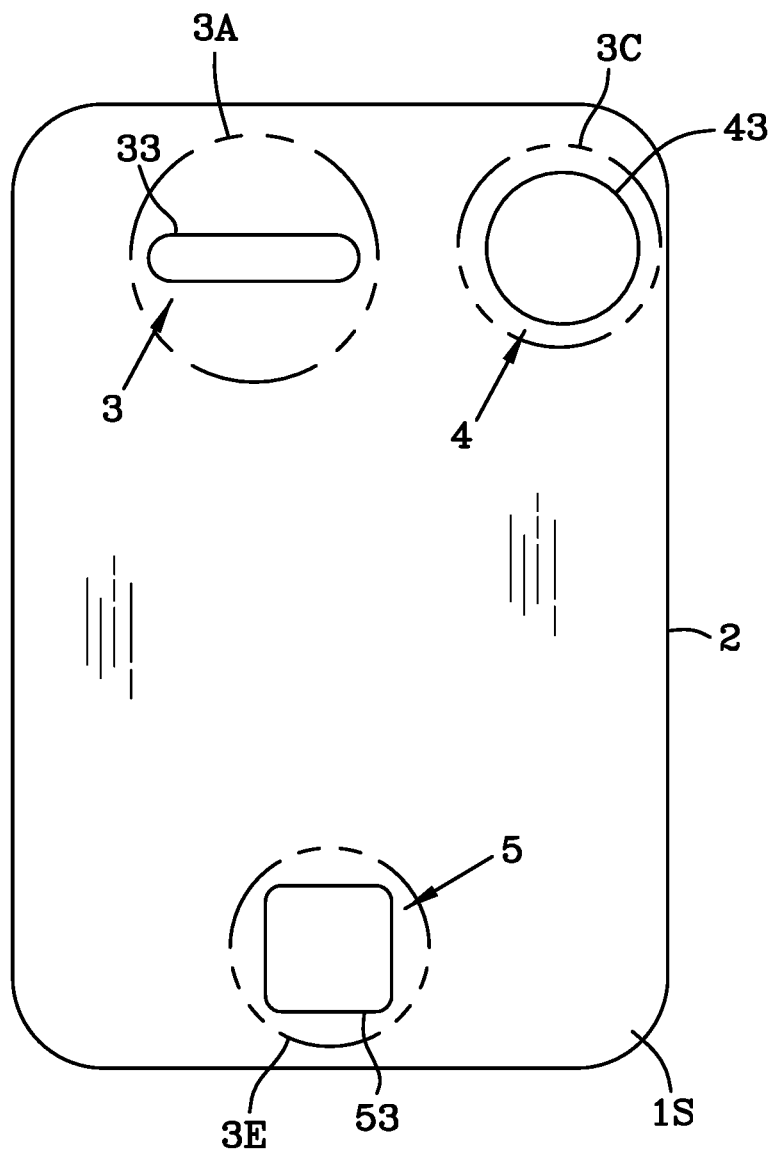
FIG. 3 is a diagrammatic illustration of a substrate with scribed closed form where the body is the desired part and the internal features will be cut out.

FIG. 3 is a diagrammatic illustration of a substrate 1S with scribed closed forms, 33, 43, and 53 where the body 1S is the desired part and the internal feature(s) are cut out (removed from the substrate). As shown in FIG. 3, when the closed forms such as any one or a combination of slot 3, circle 4 and cutout 5 made on the part 2 is not the desired part, any one or a combination of slot 3, circle 4 and cutout 5 can be dissolved and destroyed, to release any one or a combination of slot 3, circle 4 and cutout 5 from the main body. The crack line of slot 3, circle 4 or cutout 5 are etched via Hydrofluoric acid bath for some time. This etching leads to much faster dissolution of the laser irradiated area causing full separation along the filament scribed line and the inner closed form drops by itself under its own weight.

Circles (circular cut-outs), for example, can be released with radii from 1 to 50 mm by creating a zone of photoacoustic compressed material in the substrate, then dropping in etching solution.

Figure 3A:
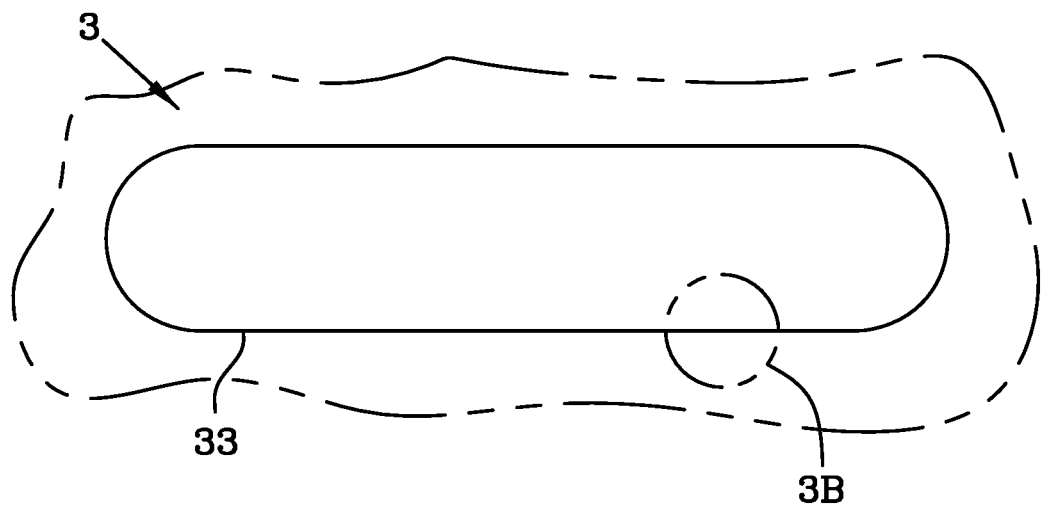
FIG. 3A is an enlargement of the slot illustrated in FIG. 3.
Figure 3B:
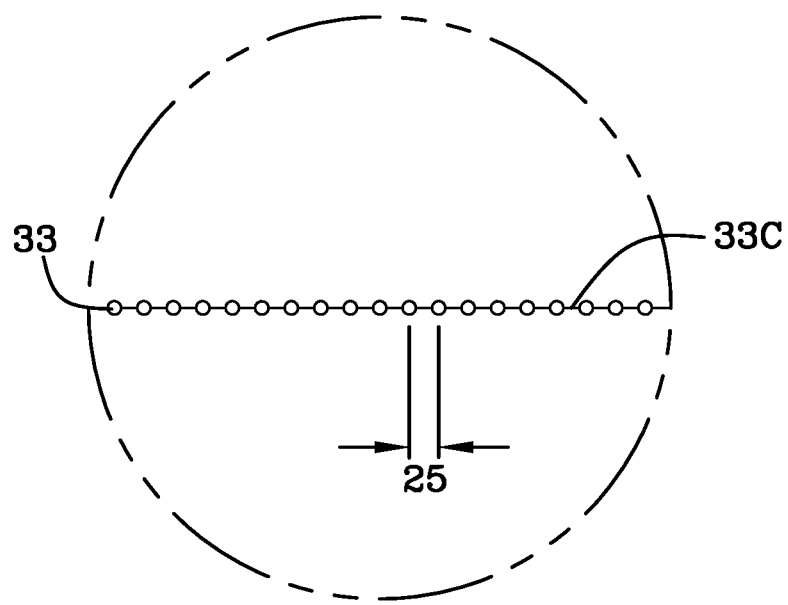
FIG. 3B is an enlargement of a portion of FIG. 3A illustrating orifices and the crack line.
Figure 3C:
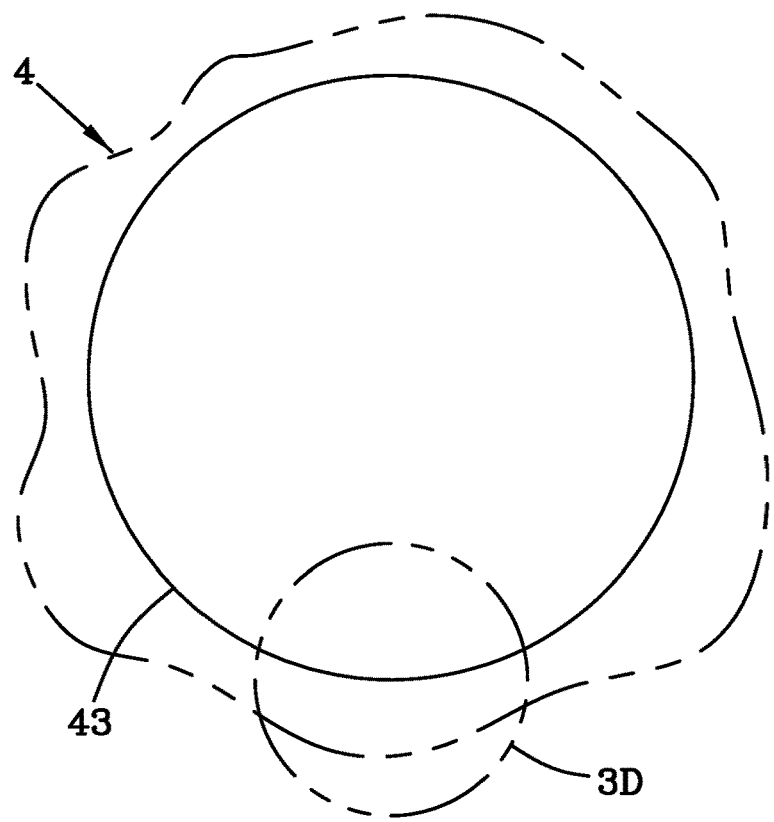
FIG. 3C is an enlargement of the circle cutout illustrated in FIG. 3.
Figure 3D:
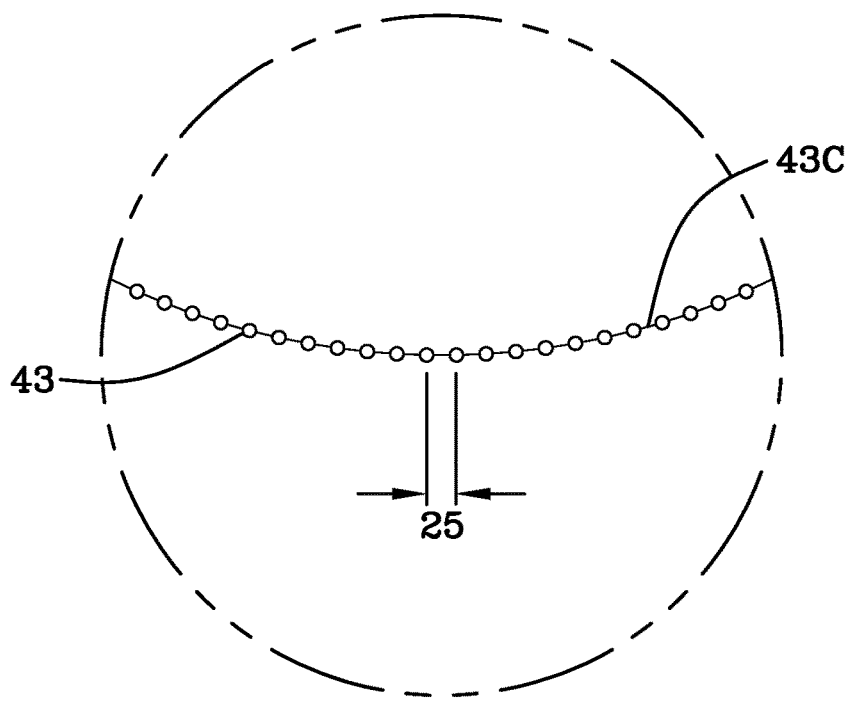
FIG. 3D is an enlargement of a portion of FIG. 3C illustrating orifices and the path of the crack line.
Figure 3E:
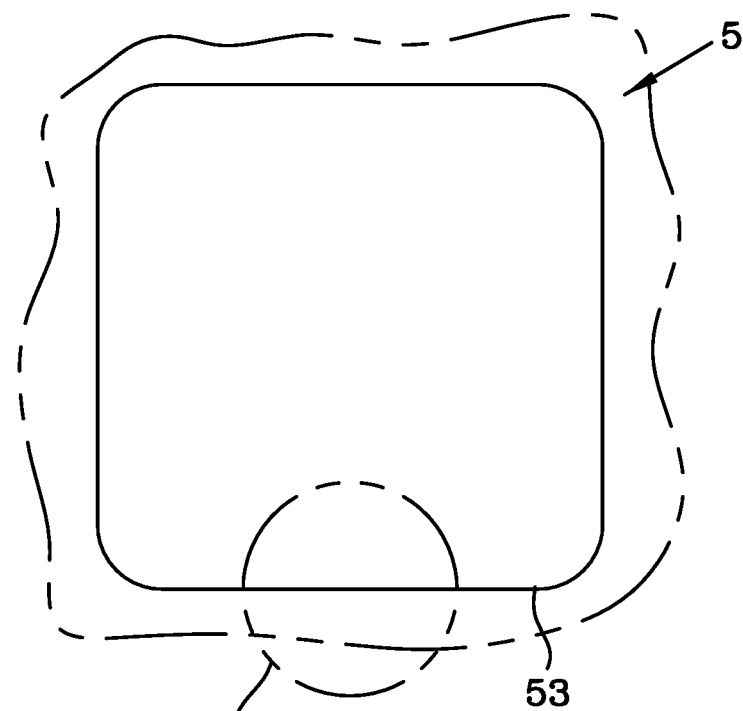
FIG. 3E is an enlargement of the square cutout of FIG. 3.
Figure 3F:
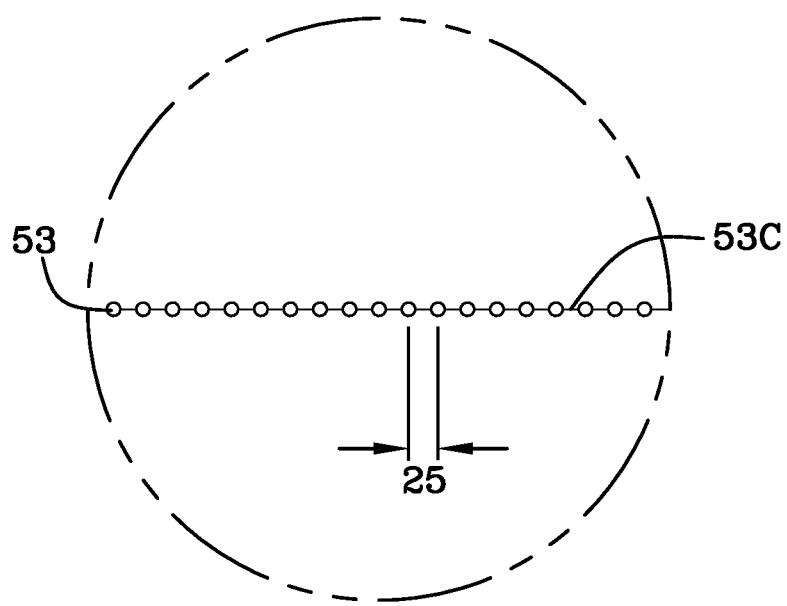
FIG. 3F is an enlargement of a portion of FIG. 3E illustrating orifices and the path of the crack line.

FIG. 3A is an enlargement of the slot 3 illustrated in FIG. 3. FIG. 3B is an enlargement of a portion of FIG. 3A illustrating orifices 33 and microcracks 33C. FIG. 3C is an enlargement of the circle cutout 4 illustrated in FIG. 3. FIG. 3D is an enlargement of a portion of FIG. 3C illustrating orifices 43 microcracks 43C. FIG. 3E is an enlargement of the square cutout 5 of FIG. 3. FIG. 3F is an enlargement of a portion of FIG. 3E illustrating orifices 53 and microcracks 53C. In all of the examples the chemical bath is used to remove the cutouts.

Figure 4:
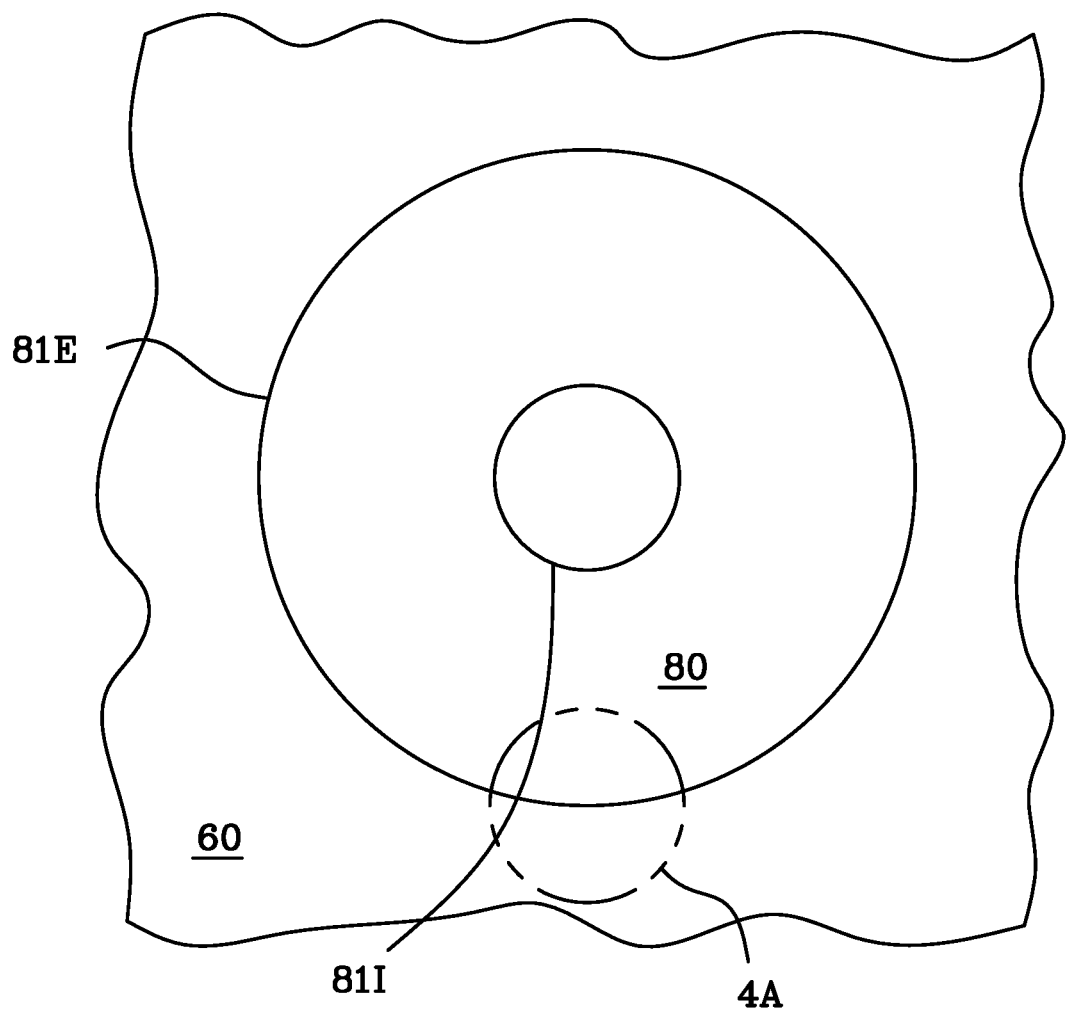
FIG. 4 is another diagrammatic illustration of a closed form release (hard disk).

Scribing glass in two circles to form a disk used for hard disk drive is challenging for industry. In the related art, after diamond roller scribing, facet quality is very poor necessitating grinding that adds to product cost. FIG. 4 is another diagrammatic illustration of a closed form release. After the substrate is scribed, the platter is released from the main body (main portion) of the substrate 60 and also the central disk 80 is also released from the platter.

Figure 4A:
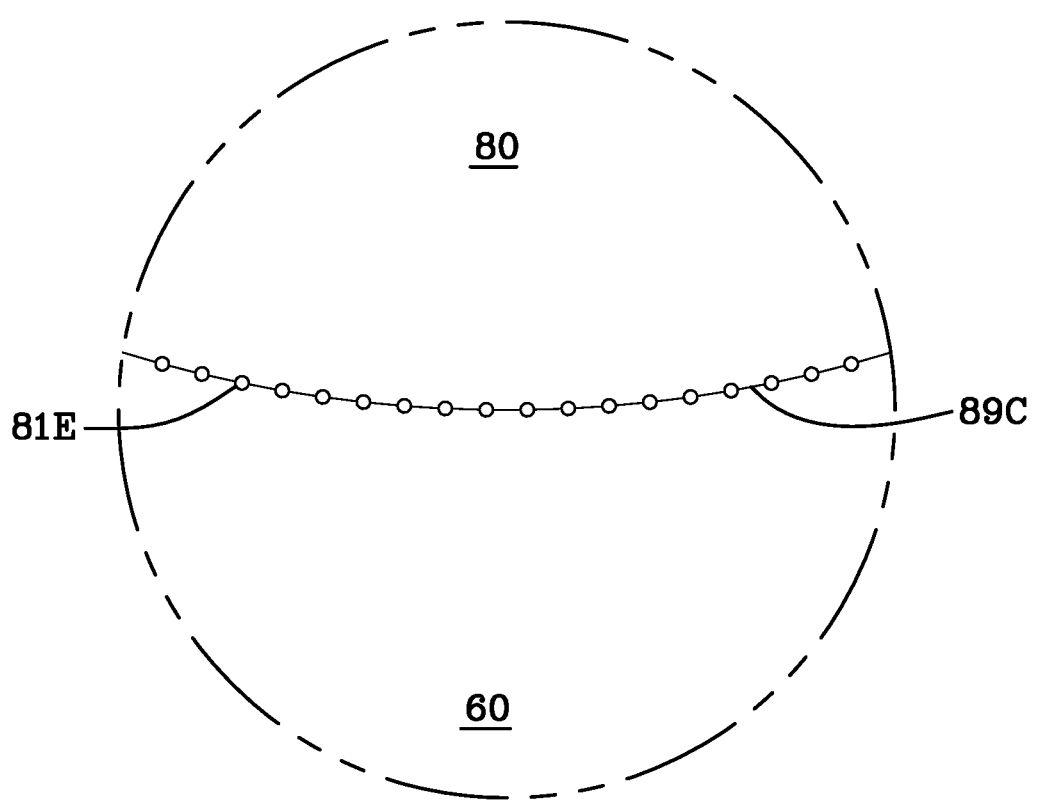
FIG. 4A is an enlargement of a portion of FIG. 4 illustrating orifices and the crack line.

FIG. 4A is an enlargement of a portion of FIG. 4 illustrating orifices 81E and microcracks 89C. Orifices 81E extend through substrate 60. All of the orifices 81E drilled in the transparent substrate are substantially cylindrically shaped with no taper.

Reference numeral 81I in FIG. 4, represents an inner scribed line in the shape of a circle and reference numeral 81E represents an outer scribed line in the shape of a circle. By scribed it is meant that the substrate includes orifices.

Scribed circles 81I, 81E are made in a matter of a second in the glass substrate 60 by the method of ultrafast burst filamentation to form perforations in the shapes of the circles. After etching the central circle 85 drops by itself under its own weight or just an air pressure or mechanical finger touch, and the disk 80 also releases from the cullet frame.

Still referring to FIG. 4, disk 80 is cut with a precision of 1 μm and with a facet roughness less than 1 μm. Since ultrafast burst filament scribing cuts the parts without any microcracks or edge chipping, there is no need for grinding.

FIG. 5A, is an illustration of a spirally cut borosilicate tube. One can see the applicability of being able to cleanly, cut curved surfaces from transparent materials. Here borosilicate glass rings sections 75, 77 are cut from a transparent tube 70. FIG. 12B is an enlargement of a portion of the tube illustrating orifices 12D in the transparent tube 70 and microcracks 12C between the orifices. The cut can be performed in a spiral motion to make a glass spring structure or tube itself can be a rod to make thin disks.

Figure 6A:
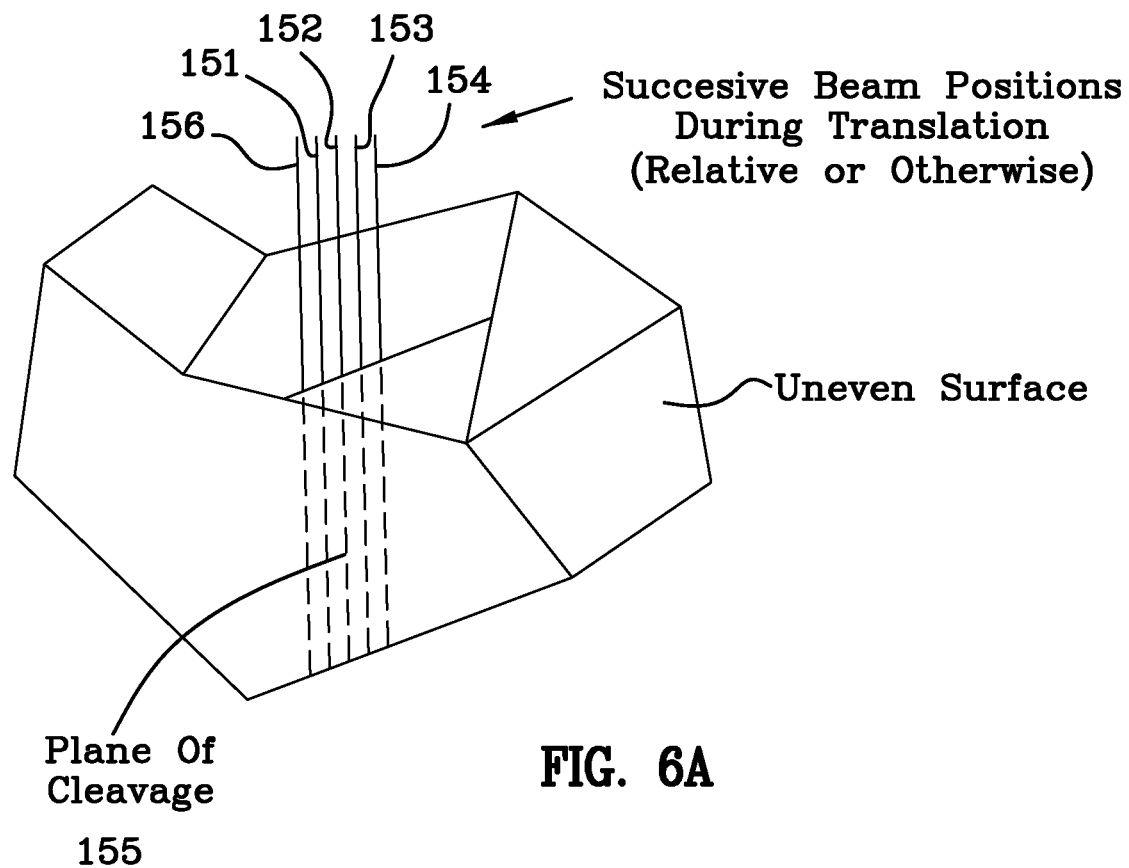
FIG. 6A shows a plane of cleavage accomplished by successively drilling orifices through the transparent material.
Figure 6B:
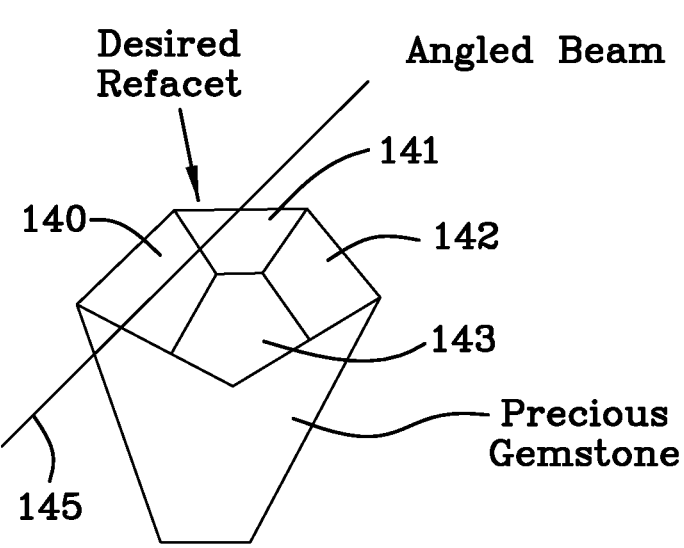
FIG. 6B shows an angled cut through a gemstone.

As shown in FIG. 6A a series of tightly spaced orifices 156, 151, 152, 153, 154 drilled through a gemstone such as diamond can be arranged so as to form a plane of cleavage 155. Due to filament formation very narrow curtain of modified zone form the plane of cleavage. Placing the gemstone in the appropriate etching solution, the etching acid moves in the orifices due to the capillary effect and creates a good separation of the material. Using this technique, much less of the valuable stone is lost during cutting process. FIG. 6B presents the final stone after a few cuts.

FIGS. 7A-E show the angled cut-out approach for making internal features with angled edges requiring no post singulation processing to achieve the desired angular result. In FIGS. 7A-E, the beam tracks 137, 142 is accomplished via rotation around the theta axis 136 with a fixed incidence angle from the laser beam, equal to the slope desired on the final part edge 765. This non-limiting embodiment enables angled cutting and translation of the rotary stage as an apparatus to support the creation of complex cutouts via filament arrays.

Figure 7A:
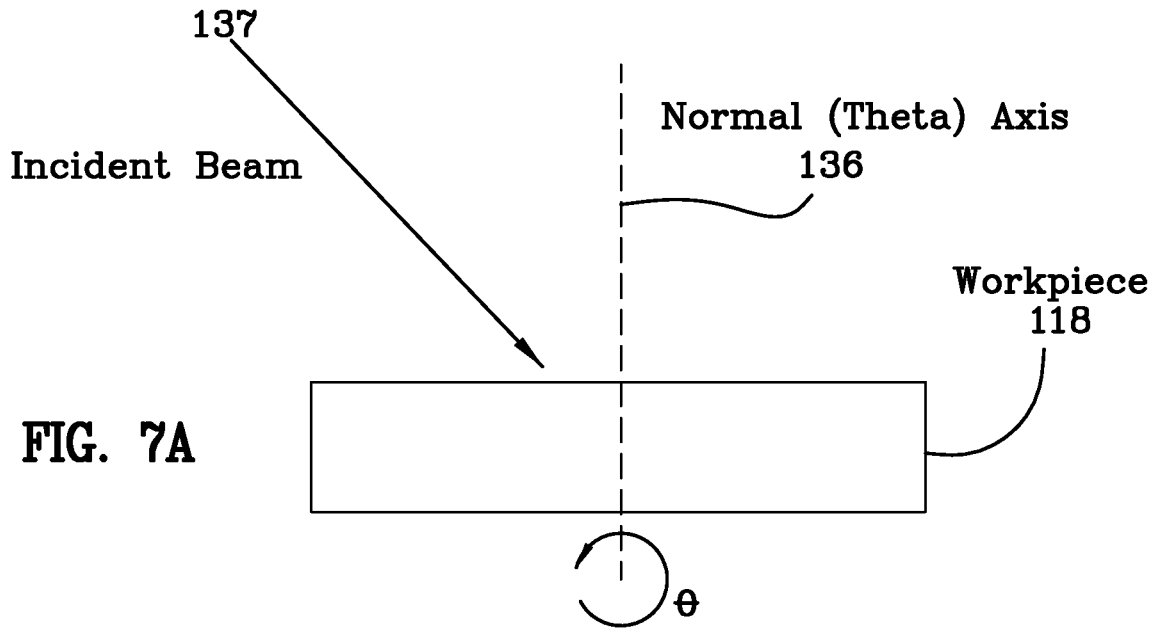
FIGS. 7A-7E show the angled cut outs which make angled edges.
Figure 7B:
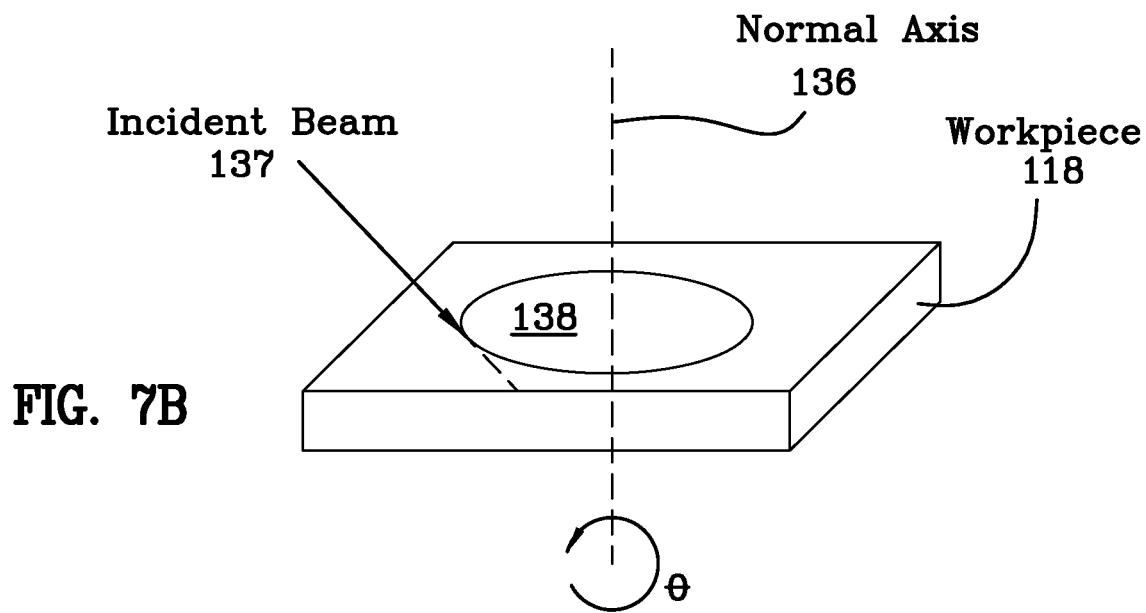
Figure 7C:
Figure 7D:
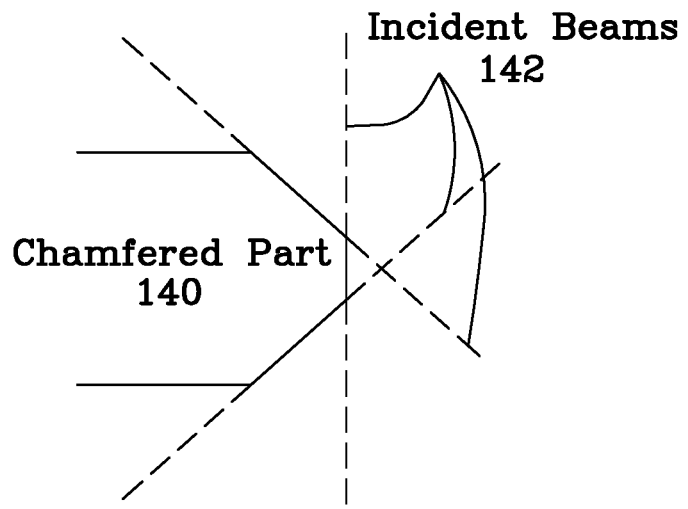
Figure 7E:
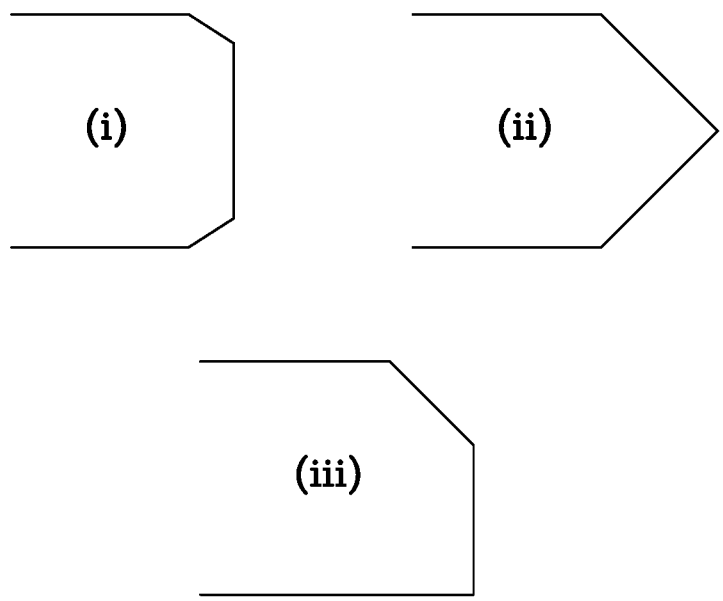
Figure 8C:
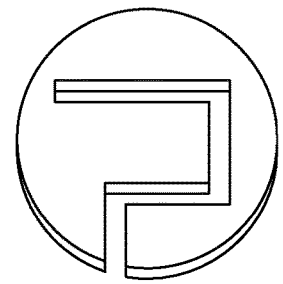
FIGS. 8A-8D illustrate different glass parts with cut outs.
Figure 8B:
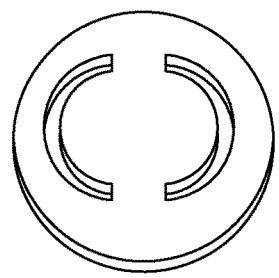
Figure 8D:
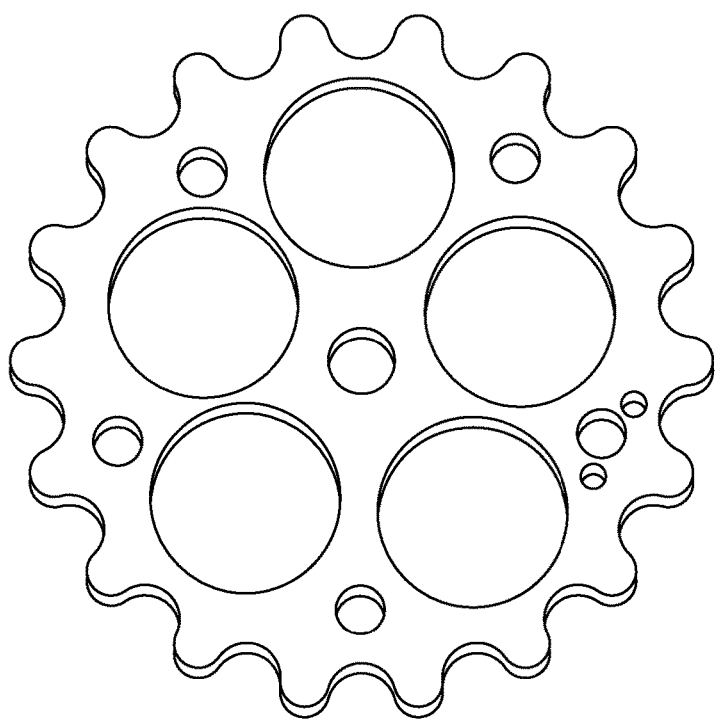
Figure 8A:
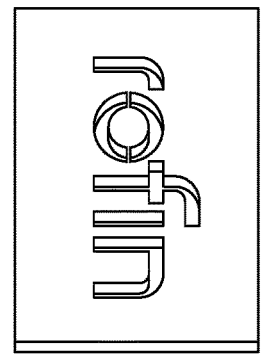

FIG. 7E illustrates an example implementation of the formation of a chamfered part 140 via processing with multiple filament forming beams 142 at different angles. It is to be understood that the beam and filament paths can be controlled to form chamfered or bevel edges of various degrees. Further, it is understood that the edge may be straight. By straight it is meant that it is perpendicular (normal) to the surface of the substrate. In the case of concerted (parallel) formation, the beam can be split and directed through optics to achieve multiple beam paths arriving at the target exhibiting angles of incidence other than normal, along with a normally incident beam, such that a three-face edge or chamfer is created.

It is to be understood that chamfers can be created with two or more faces, depending, for example, on the degree of splitting tolerated by the process. Some example configurations are illustrated in FIG. 7E. After filament formation the samples are put in an etching bath for separation.

FIGS. 8A-D present very fine cut outs of variety of shapes in the substrate. Instead of marking the alphabet and numbers, business cards or advertisement logos can be made on the substrate instead of just marking. Very fine structures such as curved or angled channels, reservoirs, gears and such can be made in glass. This opens up huge applications in regard to glass and similar materials in MEMs production where making fine parts is costly and time consuming. The parts even can have metal coatings, and they can still be etched in the chemical bath or dry etch. Channels 50 μm wide are achieved in 200 μm thick glass and the etched cleave line always follows the scribed line.

Figure 9A:
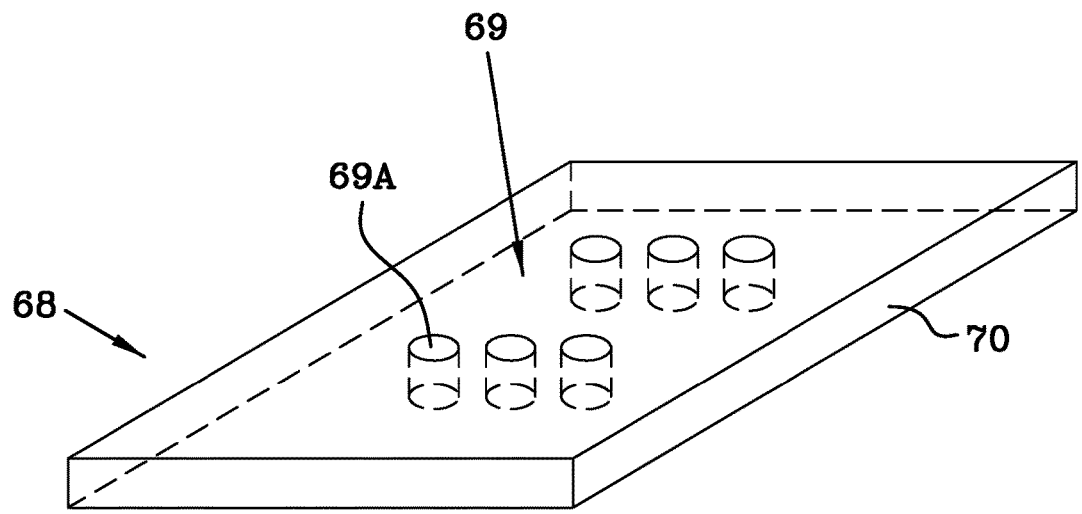
FIGS. 9A and 9B are perspective and side views, respectively, of a via hole drilling in substrate.
Figure 9B:
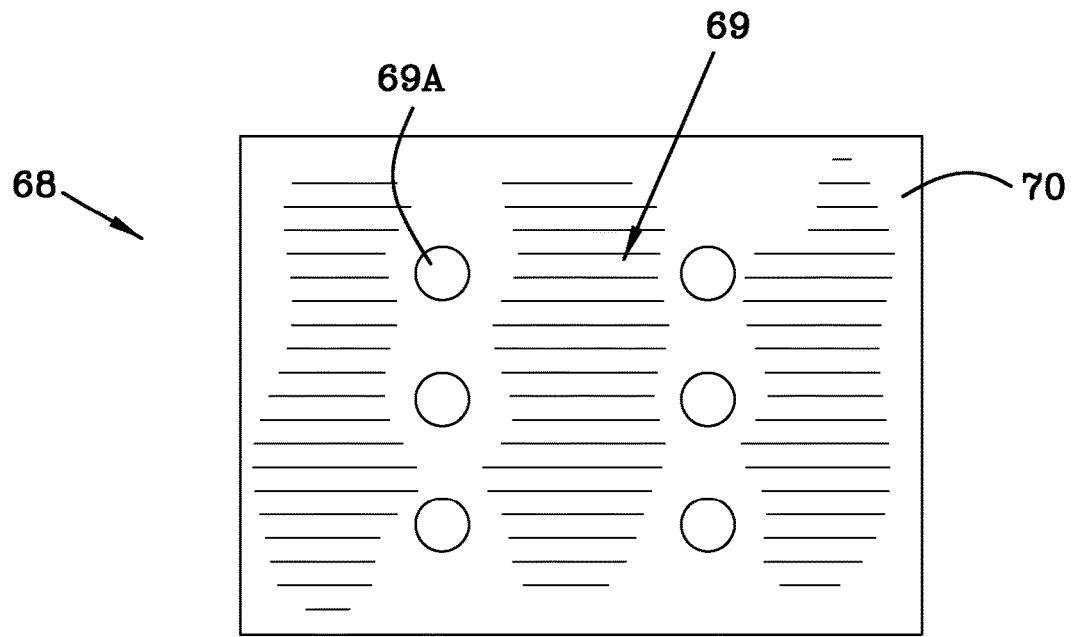

FIGS. 9A and B are a top and isometric view of via hole drilling. Holes can be used for mass filtration, via holes in glass are also used inside microelectronics chips such as CPUs as insulators between the levels and interconnect through holes.

Figure 10:
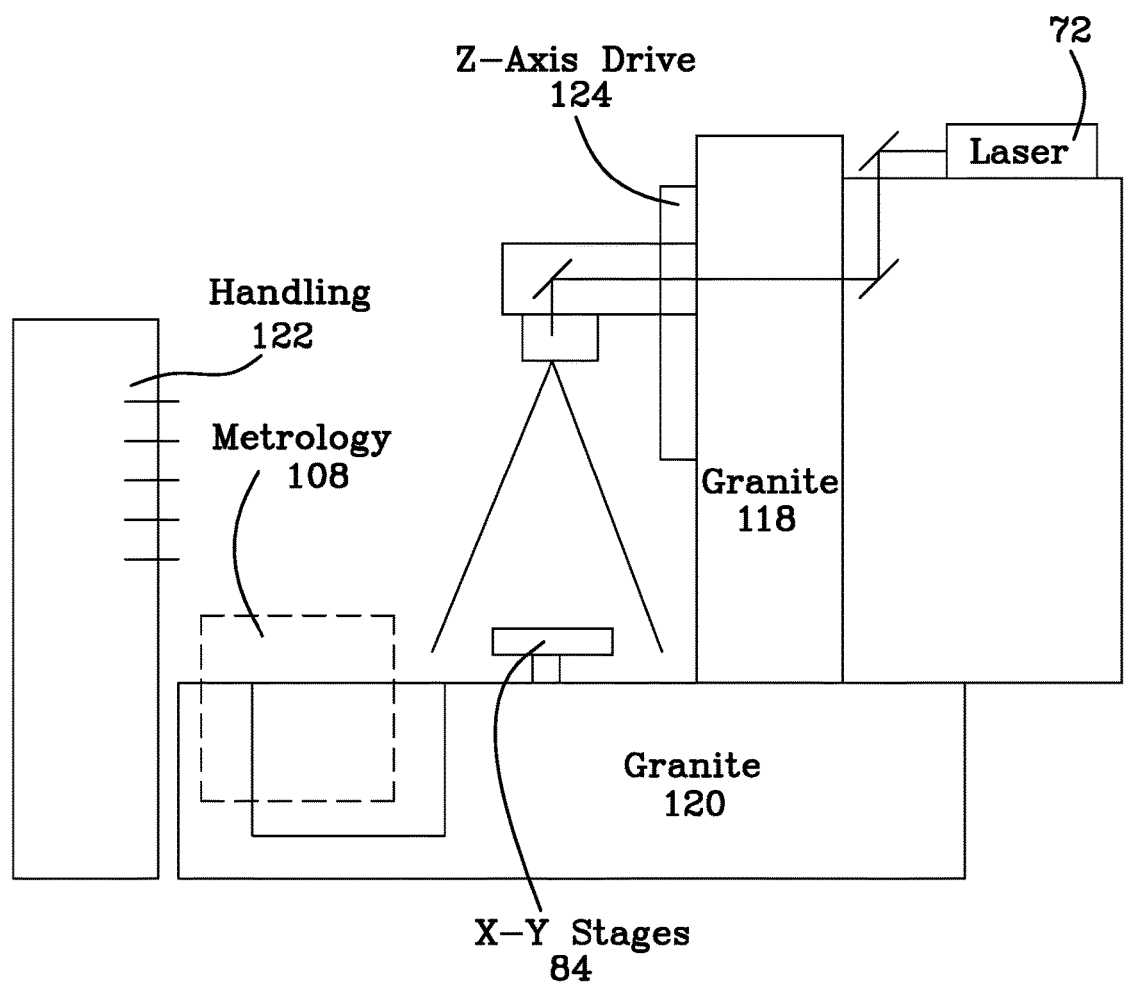
FIG. 10 illustrates an embodiment for producing filaments that is suitable for wafer size substrate machining

As shown in FIGS. 9A and B the mass separation device 68 is simply a generally planar glass substrate 70 with an array of identically sized orifices 69A (holes) drilled therethrough as illustrated in FIG. 10. In operation, the material to be separated (whether gas, fluid or solid particles) is brought in contact with the planar face of the substrate 70 as a stream, such that the material passes over the orifice array 69 with a force sufficient to pass particles through the orifices in the substrate and beyond the bottom face of the device 68. In theory, a force that is perpendicular to the plane of the device works the fastest although any angle of the stream will work to a degree. The size of the orifices drilled in the substrate will be dictated by the geometric specifics of the item being separated.

There is a huge demand to make holes of 50 to 1000 μm diameter in 50 μm up to 5 mm thick transparent material. It seems the current method is the best and most efficient way of making these via holes. As another example, via holes in glass are in huge demand for interconnects in semiconductor devices. Due to very high frequencies used in CPUs, using long wires to connect the circuits results in radiation. To avoid stacks of chips, very thin layers of glass are used as insulation layers between the chips. From level to level connections are made using through via holes. More than 100 thousand holes are sometimes needed in one sample. Holes made by laser ablation using ultrafast burst filamentation the holes (mini circles) can be scribed and later removed via chemical etching. This speeds up the manufacturing and reduces the cost per part.

FIG. 10 illustrates the layout of an example laser system suitable for part singulation. Laser 72 is capable of delivering burst pulses, for example, with energies in the range of approximately 1 μJ-50 mJ, at a repetition rate of up to approximately 2.5 MHz.

Granite riser 118 is designed to be a reactive mass for dampening mechanical vibrations, as is commonly used in industry. This could be a bridge on which the optics above the stage can translate along one axis, X or Y relative to the stage, and in coordination with it. Granite base 120 provides a reactive mass that may support any or all components of system. In some embodiments, handling apparatus 122 is vibrationally decoupled from the system for stability reasons.

Z axis motor drive 124 is provided for translating the optics (conditioning and focusing and scan optics if needed) in the Z axis relative to the servo controlled X-Y stage 84. This motion can be coordinated with the XY stage 84 and X or Y motion in the overhead granite bridge, and the XY motion of the stage on the granite base 120, which holds the sample material to be processed.

Stage 84 includes, for example, XY and Theta stages with a tilt axis, gamma ("yaw"). The motion of stages 84 is coordinated by a control computing system, for example, to create a part shape desired from a larger mother sheet. Metrology device 108 provides post processing or preprocessing (or both) measurements, for example, for mapping, sizing, and/or checking edges quality post cut.

Figure 11A:
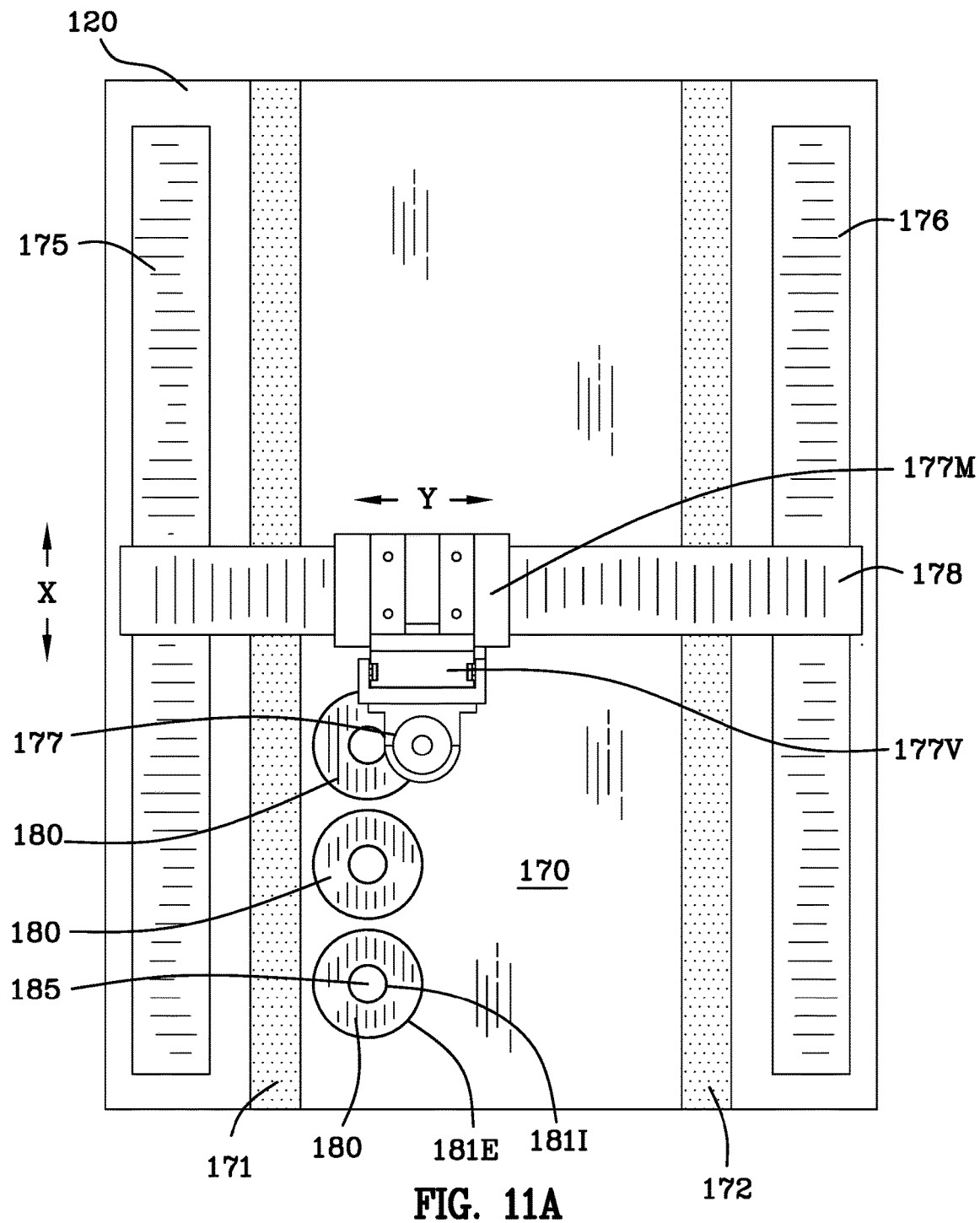
FIGS. 11A and 11B are top and front views, respectively, of the layout of an example laser system suitable for part scribing.
Figure 11B:
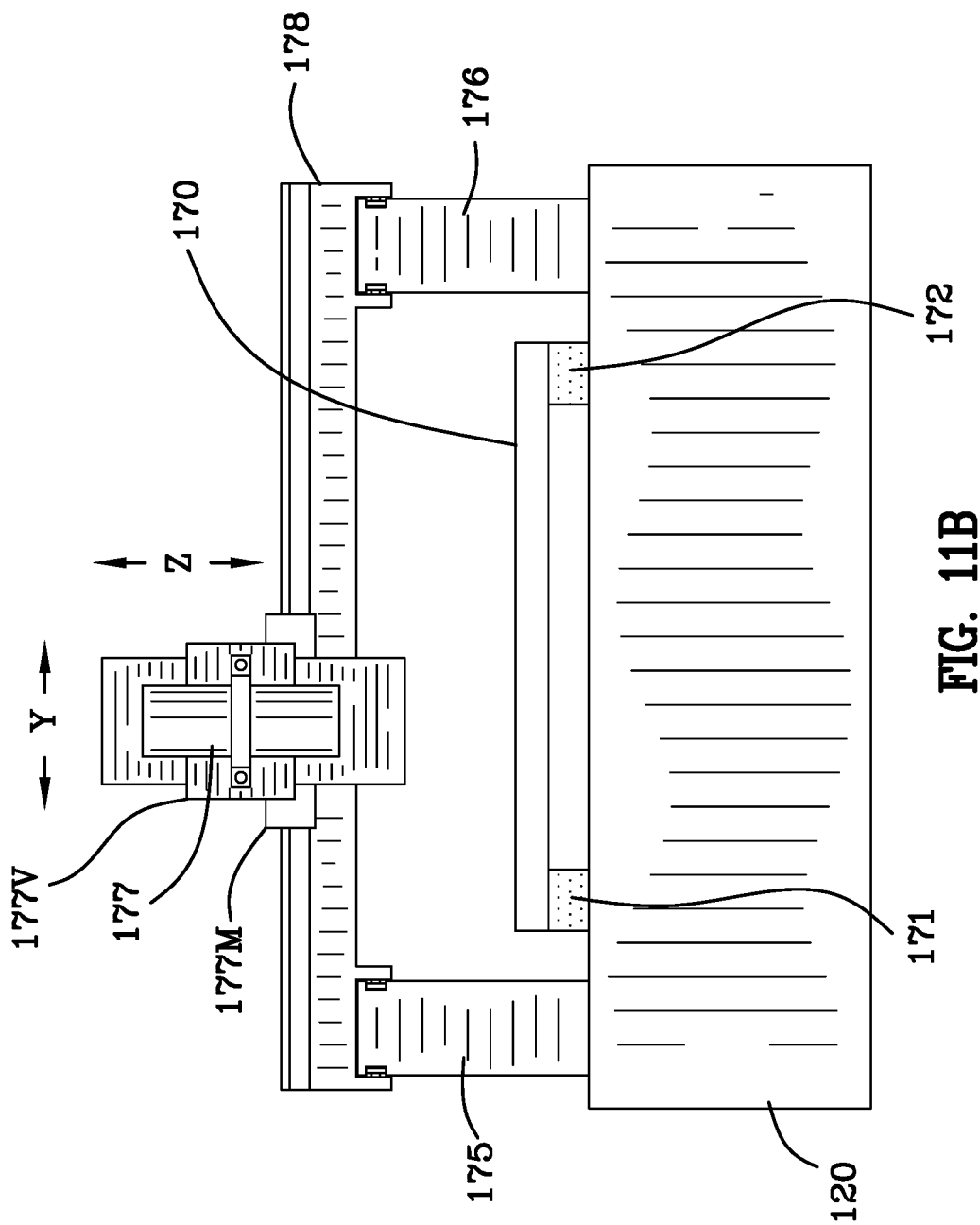

FIG. 11A is a schematic top view of an example laser system for cutting glass hard disk drive platters 180 using laser machining. X-Y motion of the laser head 177 is illustrated in FIG. 10A wherein the laser head 177 is illustrated schematically above glass substrate 170. Glass substrate 170 is supported by beams 171, 172 above a granite (or other dimensionally stable) support 120. Rails 175, 176 support the movable arm 178 which is movable in the X direction along the rails 175, 176 as illustrated in FIG. 10A. Movable arm 178 is driven by a motor and a controller which precisely positions the movable arm 178 in the X direction. Similarly, the laser head is driven by a motor and a controller and is precisely movable and positioned along the movable arm 178 in the Y direction as illustrated in FIGS. 11A and 11B. FIG. 11B is a schematic side view of the example laser system for cutting glass hard disk drive platters illustrated in FIG. 11A.

Movable arm 178 includes rail means and the laser head 177 includes a motor 177M or other means for positioning the laser head 177 in the Y direction. Further the laser head in movable in the Z direction for adjusting the beam waists as desired. Vertical rail 177V enables movement of the laser head 177 in the vertical direction (the Z direction). Still further, it is understood that a selected distributive-focus lens may be adapted for use with the laser head 177. Glass hard disk drive platters 180 are illustrated in FIG. 25A and in FIG. 4.

Multiple sheets of big size glass containing many disks are left in the chemical bath. As such, the central circle and platter releases from the main substrate with great facet quality and precision. The hard disk just described was just an example, it can be almost any part made of brittle material in flat or curved form.

Figure 12:
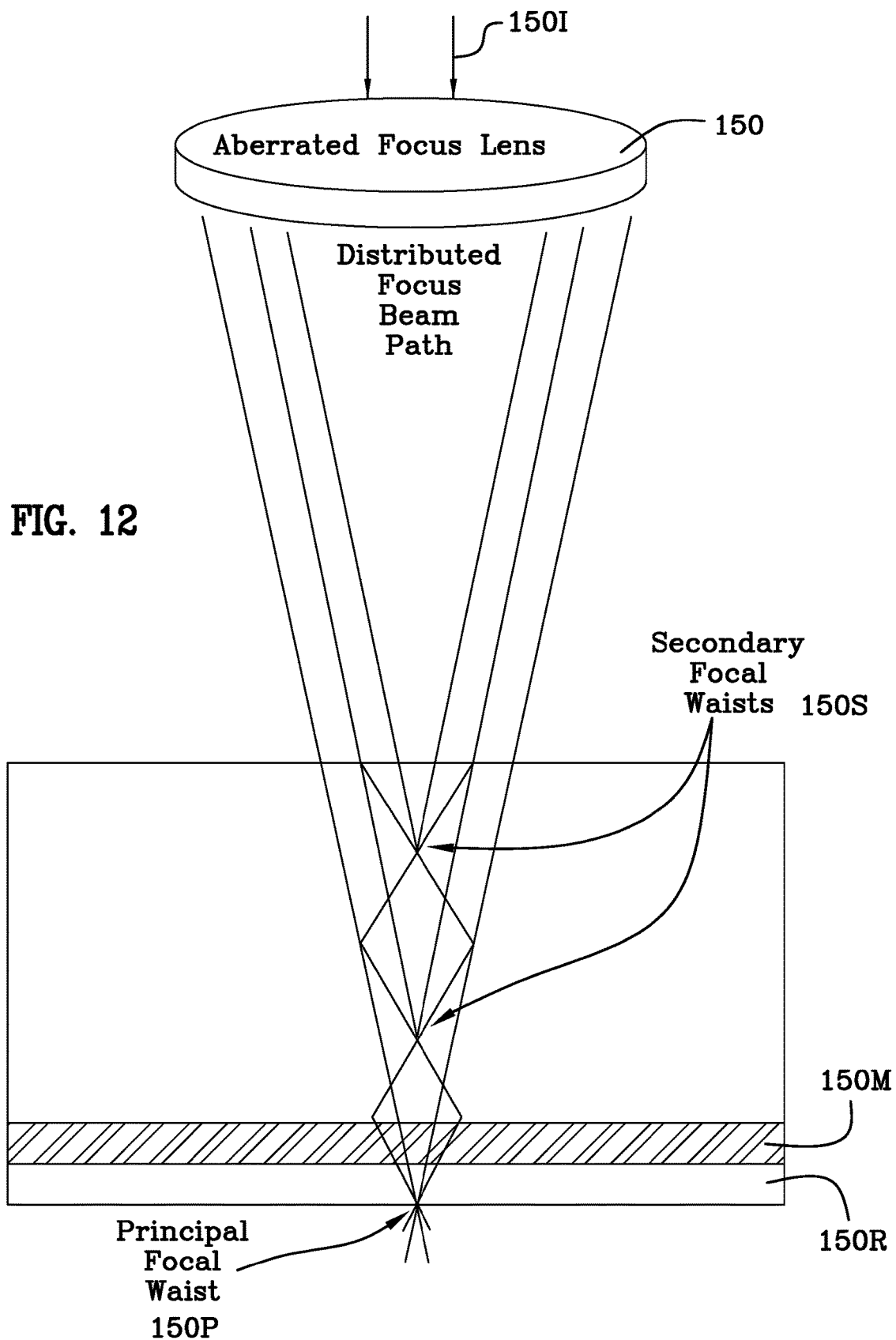
FIG. 12 is a side schematic view of a transparent substrate illustrating an incoming laser beam entering an aberrated focus lens, a metal layer engaging the bottom surface of the transparent substrate, photoresist engaging the metal layer, the principal focal waist of the laser beam residing on the surface of the photoresist, and secondary focal waists within the transparent substrate.

FIG. 12 is a side schematic view of a transparent substrate 150T illustrating an incoming laser beam 150I entering an aberrated focus lens 150, a metal layer 150M engaging the bottom surface of the transparent substrate, photoresist 150R engaging the metal layer 150M, the principal focal waist 150P of the laser beam residing on the surface of the photoresist 150R, and secondary focal waists 150S within the transparent substrate 150T.

FIG. 13 is a side schematic view illustrating a transparent substrate 150T with holes 150H therethrough, the metal layer 150M engaging the transparent substrate 150T, photoresist 150R engaging the metal layer 150M, being wet etched—the transparent substrate 150T, metal layer 150M and photoresist 150R are submersed in a chemical etchant 301. The desired portion of the transparent substrate 180 is separated from the remainder portion of the transparent substrate 150T by gravity after the transparent substrate resides in the etchant for a sufficient time. Supports 302A, 302B and 301C reside beneath the remainder portion of the transparent substrate. The remainder portion is the portion that is left behind after the desired portion has been removed therefrom.

The arrangement illustrated in FIG. 13 is within a container 303 full of etchant 301. The etchant resides within the holes 150H of the substrate and weakens exposed surfaces of the holes 150H of the transparent substrate 150T. The wet etchant may be any of those previously identified herein suitable for use with transparent substrates identified herein.

FIG. 13A is a top view of the transparent substrate 150T illustrated in FIG. 13 illustrating a plurality of holes through the substrate with crack lines 151C, 152C formed between the holes 150H thereof. The holes 150H are very small diameter holes as explained herein with other drawing figures. Holes 150H are closely spaced together. Holes 150H are made by laser filamentation. Preferably, the spacing between the holes (orifices) is 2-10 µm center to center. Holes 150H are less than or equal to approximately 1 µm in diameter. Crack lines 151C, 152C are formed between adjacent holes 150H resulting in a smooth surface when the desired part 180 is separated from the substrate 150T. The desired part, in this example a disk 180, may be separated when removed from the bath 301 under its own weight or the slight urging of a mechanical device, a mechanical finger (not shown), or air pressure.

Referring to FIG. 13 the capillary effect assists in drawing the wet etchant 301 into the holes 150H which extend through the substrate. The capillary effect is present due to the extremely small diameter holes that are made by the filamentation process described herein. Still referring to FIG. 13 the holes 150H are filled with etchant 301. The etchant symbol (the fluid symbol) is not used in the holes 150H because it would be difficult to see in drawing FIG. 13. Etchant 301 within the holes 150H weakens the transparent material along the crack line of the transparent material facilitating separation of the parts with smooth edges.

Figure 14:
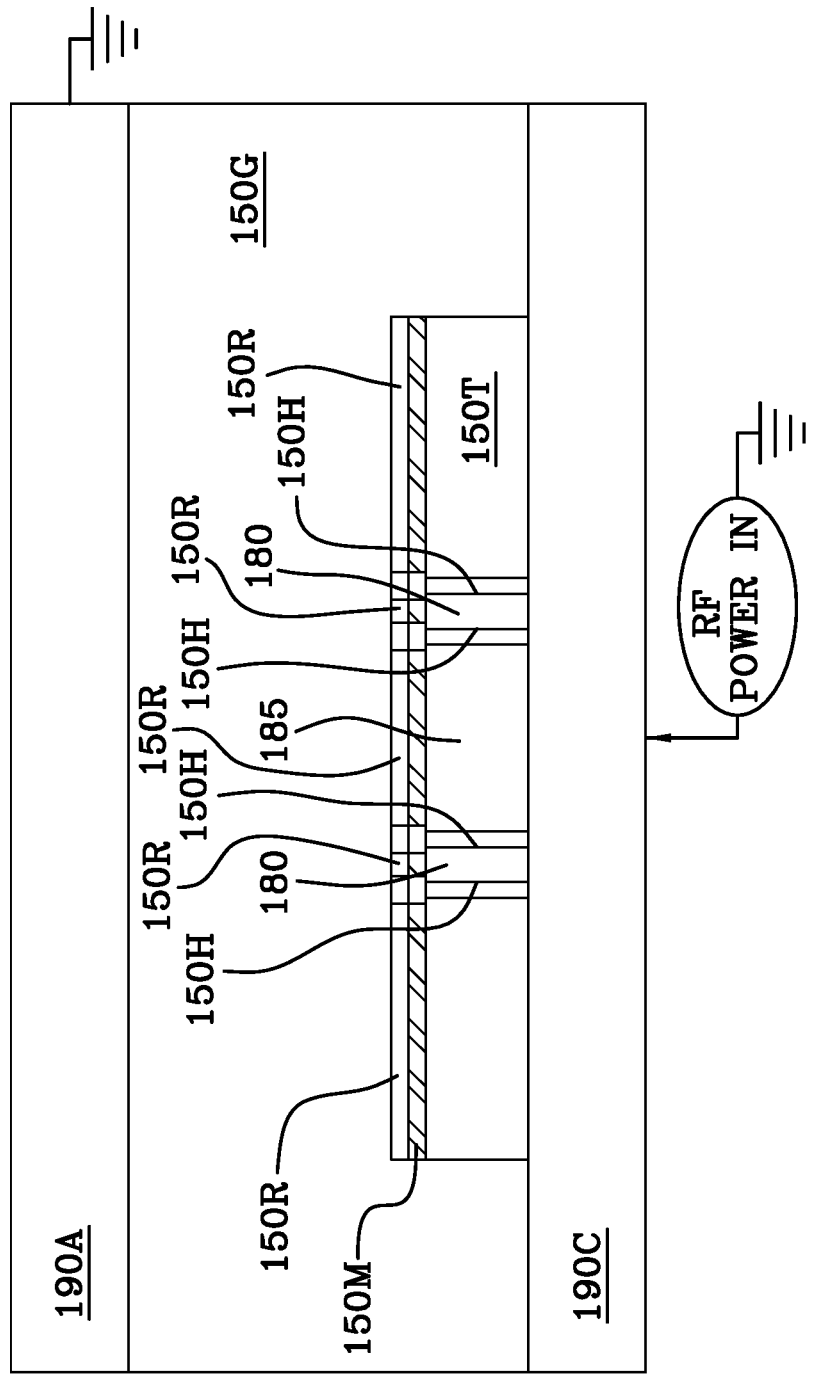

FIG. 14 is a side schematic view illustrating a transparent substrate 150T with holes 150H therethrough being dry etched, the transparent substrate 150T has a metal layer 150M in engagement with a surface of the transparent substrate and a layer of photoresist 150R in engagement with the metal layer 150M. Electrodes 190A, 190C are excited by an RF voltage source which acts on the gas/plasma 150G between the electrodes which excites the dry etchant. The etchant resides within the holes 150H of the substrate and weakens exposed surfaces of the holes 150H of the transparent substrate 150T. The dry etchant may be any of those etchants previously identified herein suitable for use on the transparent substrates identified herein. Nothing herein limits the type of dry etching that is used.

An exemplary method of laser processing a transparent material 150T, includes the following the steps. The transparent material has a metal layer 150M formed in engagement with the transparent material and the metal layer 150M has a photoresist layer 150R formed in engagement with the metal layer 150M. A laser beam 150I (FIG. 12), the laser beam includes a burst of laser pulses, the burst of laser pulses may be a single pulse or multiple pulses. Externally focusing the laser beam relative to the transparent material 150T to form a beam waist 150P at a location that is external to the transparent material while avoiding the formation of an external plasma channel. The laser pulses are focused such that sufficient energy density is maintained within the transparent material to form a continuous laser filament therein without causing optical breakdown. The process requires simultaneously forming the continuous laser filament (220, FIG. 1) within the transparent material and simultaneously forming a low-power laser beam to ablate the photoresist layer 150R and the metal layer 150M, the power of the filament-forming laser beam is reduced below the threshold for the simultaneous of the filament within and through the transparent material while maintaining sufficient power to ablate and irradiate the photoresist layer 150R and the metal layer 150M with the low-power laser beam at one or more locations such that the metal layer 150M is locally ablated by the laser beam thereby removing the metal layer 150M in proximity to a hole 150H through the transparent material 150T formed by the continuous laser filament. The continuous laser filament is formed within and through the substrate at the same time the photoresist layer and the metal layer are ablated and removed. Once the photoresist layer and the metal layer are removed, the holes may be etched using a wet or dry process. The process requires selectively etching the hole 150H through the transparent material while the remaining photoresist 150R avoids damage to the metal layer. The photoresist effectively eliminates collateral damage to the metal layer by preventing exposure of the wet or dry etchant to the metal layer. The photoresist layer and the metal layer are removed in proximity to holes 150H as shown in FIGS. 13 and 14. It should be noted that various masks can be used in both the wet etching process and the dry etching process. The photoresist layer and the metal layer are removed simultaneously with the formation of a filament(s). See FIG. 14.

The invention is also suitable for printing metal on a transparent material. The transparent material receives a layer of metal thereon and then a layer of photoresist is applied to the metal. A mask is then applied to the metal layer. The mask prevents light from reaching the photoresist underneath the mask. The mask forms, for instance, the letter A. Suitable light is applied to the photoresist which is exposed and not covered by the mask. Since the invention teaches simultaneous ablation of the photoresist, ablation of the metal, and formation of holes through the transparent material by photoacoustic compression, techniques for etching the metal and the transparent material can be used to produce a high quality letter A.

The invention claimed is:

1. A method of laser processing a transparent material, comprising the steps of:
a laser source configured to provide a laser beam comprising bursts of laser pulses;
one or more focusing elements configured to externally focus said laser beam relative to the transparent material to form a beam waist at a location external to said transparent material while avoiding the formation of an external plasma channel;
the laser beam and said one or more focusing elements are configured to produce sufficient energy density within said transparent material to form a continuous laser filament therein;
means for varying a relative position between said laser beam and said transparent material;
a control and processing unit operatively coupled to said means for varying said relative position between said laser beam and said transparent material;
said control and processing unit is configured to control said relative position between said laser beam and said transparent material for the formation of an array of continuous laser filaments within said transparent material;
said array of continuous laser filaments extending continuously from a first surface of said transparent material to a second surface of said transparent material; and,
selectively wet or dry etching said array of continuous laser filaments for releasing the closed form.

2. The method of laser processing a transparent material as claimed in claim 1, wherein said transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics, ALON, crystalline rods, GaN, SiC and ZnSe.

3. The method of laser processing a transparent material as claimed in claim 1, wherein said dry etching is performed with a plasma of reactive gases selected from the group consisting of $CF_4$, $SF_6$, $NF_3$, $Cl_2$, and $CCl_2F_2$.

4. The method of laser processing a transparent material as claimed in claim 1, wherein said wet etching is performed with a wet etchant selected from the group consisting of Nitric acid (HNO3) and hydrofluoric acid (HF), Potassium hydroxide (KOH), Ethylenediamine pyrocatechol (EDP), and Tetramethylammonium hydroxide (TMAH).

5. The method of laser processing a transparent material as claimed in claim 1, said transparent substrate has a post-cleave or post-singulation break strength that exceeds approximately 50 MPa.

6. The method of laser processing a transparent material as claimed in claim 1, wherein said continuous laser filament has a length exceeding approximately 1 mm.

7. A method of laser processing a transparent material, comprising the steps of:
said transparent material has a metal layer formed in engagement with said transparent material and said metal layer has a photoresist layer formed in engagement with said metal layer,
providing a laser beam, said laser beam includes a burst of laser pulses, said burst of laser pulses may be a single pulse or multiple pulses;
externally focusing said laser beam relative to said transparent material to form a beam waist at a location that is external to said transparent material while avoiding the formation of an external plasma channel;
said laser pulses are focused such that sufficient energy density is maintained within said transparent material to form a continuous laser filament therein;
simultaneously forming said continuous laser filament within said transparent material and simultaneously forming a low-power laser beam to ablate said photoresist layer and said metal layer, the power of said filament-forming laser beam is reduced below the threshold for said simultaneous of said filament within and through said transparent material while maintaining sufficient power to ablate and irradiate said photoresist layer and said metal layer with said low-power laser beam at one or more locations such that said metal layer is locally ablated by said laser beam thereby removing said metal layer in proximity to a hole through said transparent material formed by said continuous laser filament; and,
selectively etching said hole through said substrate of said transparent material while said photoresist avoids damage to said metal layer.

8. The method of laser processing a transparent material as claimed in claim 7, wherein said transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics, crystalline rods, GaN, SiC and ZnSe.

9. A method of laser processing a transparent material as claimed in claim 7 wherein said transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics, crystalline rods, GaN, SiC and ZnSe.

10. The method of laser processing a transparent material as claimed in claim 7, wherein said dry etching is performed with a plasma of reactive gases selected from the group consisting of $CF_4$, $SF_6$, $NF_3$, $Cl_2$, and $CCl_2F_2$.

11. The method of laser processing a transparent material as claimed in claim 7, wherein said continuous laser filament has a length exceeding approximately 1 mm.

12. The method of laser processing a transparent material as claimed in claim 7, wherein said transparent substrate has a post-cleave or post-singulation break strength that exceeds approximately 50 MPa.

13. A method of laser processing a transparent material, comprising the steps of:
   said transparent material has a metal layer formed in engagement with said transparent material and said metal layer has a photoresist layer formed in engagement with said metal layer;
   providing a laser beam, said laser beam includes a burst of laser pulses, said burst of laser pulses may be a single pulse or multiple pulses;
   externally focusing said laser beam relative to said transparent material to form a beam waist at a location that is external to said transparent material while avoiding the formation of an external plasma channel;
   said laser pulses are focused such that sufficient energy density is maintained within said transparent material to form a continuous laser filament therein;
   simultaneously forming said continuous laser filament within said transparent material and simultaneously forming a low-power laser beam to ablate said photoresist layer and said metal layer, the power of said filament-forming laser beam is reduced below the threshold for said simultaneous of said filament within and through said transparent material while maintaining sufficient power to ablate and irradiate said photoresist layer and said metal layer with said low-power laser beam at one or more locations such that said metal layer is locally ablated by said laser beam thereby removing said metal layer in proximity to a hole through said transparent material formed by said continuous laser filament;
   creating a plurality of holes through said transparent substrate and removing a portion of said metal layer and a portion of said photoresist layer in proximity to each one of said holes of said plurality of holes through said substrate; and,
   selectively etching said hole through said substrate of said transparent material while said photoresist avoids damage to said metal layer.

14. A method of laser processing a transparent material as claimed in claim 13 wherein said transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics, crystalline rods, GaN, SiC and ZnSe.

15. The method of laser processing a transparent material as claimed in claim 13, wherein said dry etching is performed with a plasma of reactive gases selected from the group consisting of $CF_4$, $SF_6$, $NF_3$, $Cl_2$, and $CCl_2F_2$.

16. The method of laser processing a transparent material as claimed in claim 13, wherein said wet etching is performed with a wet etchant selected from the group consisting of Nitric acid (HNO3) and hydrofluoric acid (HF), Potassium hydroxide (KOH), Ethylenediamine pyrocatechol (EDP), and Tetramethylammonium hydroxide (TMAH).

17. A method of laser processing a transparent material, comprising the steps of:
   said transparent material includes a metal layer in engagement with said transparent material, and, a photoresist layer resides in engagement with said metal layer;
   providing a laser beam, said laser beam having a plurality of bursts and each of said bursts include a plurality of pulses;
   generating an initial waist of said laser beam outside said transparent material using an uncorrected or aberrated optical focusing element;
   generating a weakly focused laser beam distributed within said transparent material;
   producing a spatially extended and spatially homogenous filament in said transparent material;
   forming an array of filaments within said transparent substrate;
   removing a portion of said metal layer and a portion of said photoresist proximate each of said continuous laser filaments; and,
   selectively dry or wet etching said array of continuous laser filaments.

18. A method of laser processing a transparent material as claimed in claim 17, further comprising the step of:
   optical monitoring of said filaments is employed to provide feedback to facilitate active control of said formation of said array of said filaments within said transparent substrate.

19. A method of laser processing a transparent material as claimed in claim 17 wherein said transparent material is selected from the group consisting of glass, borosilicate glass, amber glass, chemically or heat strengthened glass, sapphire, $LiNbO_3$, Silicon, Ti:Sapphire, $LiTaO_3$, transparent ceramics, crystalline rods, GaN, SiC and ZnSe.

20. The method of laser processing a transparent material as claimed in claim 17, wherein said dry etching is performed with a plasma of reactive gases selected from the group consisting of $CF_4$, $SF_6$, $NF_3$, $Cl_2$, and $CCl_2F_2$.

21. The method of laser processing a transparent material as claimed in claim 17, wherein said wet etching is performed with a wet etchant selected from the group consisting of Nitric acid (HNO3) and hydrofluoric acid (HF), Potassium hydroxide (KOH), Ethylenediamine pyrocatechol (EDP), and Tetramethylammonium hydroxide (TMAH).

22. The method of laser processing a transparent material as claimed in claim 13, further comprising the steps of:
   separating said transparent material along a crack line producing a smooth edge along said crack line.

23. The method of laser processing a transparent material as claimed in claim 22, further comprising the steps of:
   creating a scribe line that is less than 15 μm in width.

24. A product with precise geometry made by the process of claim 23.

* * * * *